US012689299B2

(12) United States Patent
    Aso

(10) Patent No.: US 12,689,299 B2
(45) Date of Patent: Jul. 21, 2026

(54) ACTIVE CLAMP FLYBACK CONVERTER

(71) Applicant: SANKEN ELECTRIC CO., LTD.,
        Niiza (JP)

(72) Inventor: Shinji Aso, Niiza (JP)

(73) Assignee: SANKEN ELECTRIC CO., LTD.,
        Niiza-Shi (JP)

( * ) Notice: Subject to any disclaimer, the term of this
        patent is extended or adjusted under 35
        U.S.C. 154(b) by 164 days.

(21) Appl. No.: 18/751,388

(22) Filed: Jun. 24, 2024

(65) Prior Publication Data
        US 2025/0023478 A1     Jan. 16, 2025

(30) Foreign Application Priority Data

Jul. 10, 2023     (JP) ................................. 2023-113163

(51) Int. Cl.
        *H02M 3/335*     (2006.01)
        *H02M 1/00*     (2006.01)
        *H02M 1/34*     (2007.01)
        *H02M 3/00*     (2006.01)
(52) U.S. Cl.
        CPC ..... *H02M 3/33507* (2013.01); *H02M 1/0009*
        (2021.05); *H02M 1/0058* (2021.05); *H02M*
        *1/348* (2021.05); *H02M 3/01* (2021.05)
(58) Field of Classification Search
        CPC .... H02M 3/33507; H02M 3/01; H02M 3/315;
        H02M 3/3155; H02M 3/335; H02M 3/33515; H02M 3/33523; H02M 3/33553;
H02M 3/33561; H02M 3/33569; H02M
3/015; H02M 1/0009; H02M 1/0003;
H02M 1/348; H02M 1/34; H02M 1/342;
H02M 1/344; H02M 1/0058
See application file for complete search history.

(56) References Cited

U.S. PATENT DOCUMENTS

2017/0264206 A1*   9/2017   Rana ................. H02M 3/33569

FOREIGN PATENT DOCUMENTS

CN          101572490 A     11/2009

* cited by examiner

*Primary Examiner* — Nguyen Tran
(74) *Attorney, Agent, or Firm* — METROLEX IP LAW
GROUP, PLLC; Robert L. Scott, Esq.

(57) ABSTRACT

An active flyback converter according to one or more
embodiments may include a transformer, a first series circuit
including the primary winding and a main switch connected
in series at both terminals of the DC power supply, a second
series circuit including a switch and a capacitor connected in
series at both terminals of the primary winding, a controller
that turns on and off the main switch and the switch, a
rectifier smoothing circuit, and an output voltage detector
that detects the output voltage of the rectifier smoothing
circuit. In one or more embodiments, the controller may
control a first off period from a first drive signal is turned off
to a second drive signal is turns on, and a second off period
from the second drive signal is turned off to a third drive
signal is turned on.

6 Claims, 18 Drawing Sheets (a) Io=4A,fsw=97kHz (b) Io=3A,fsw=113kHz (c) Io=2A,fsw=87kHz (d) Io=1A,fsw=54kHz

ACTIVE CLAMP FLYBACK CONVERTER

CROSS REFERENCE TO RELATED APPLICATIONS

This application claims priority to prior Japanese Patent Application No. 2023-113163 filed with the Japan Patent Office on Jul. 10, 2023, the entire contents of which are incorporated herein by reference.

BACKGROUND

The disclosure relates to an active clamp flyback converter.

A flyback converter has been proposed as a power supply circuit for isolated DC-DC converters. In the flyback converter, current flows through the primary winding of the transformer when the main switch is in the on state, and energy is stored in the inductance of the transformer. Then, when the main switch is in the off state, the energy stored in the excitation inductance is extracted from the secondary winding of the transformer, and power is transferred from the primary side to the secondary side.

To improve the efficiency of flyback converters, an active clamp flyback converter (ACF converter) that includes a resistor-capacitor-diode (RCD) snubber circuit with a clamp switch and a clamp capacitor has been proposed. The RCD snubber circuit suppresses the surge voltage by recovering leakage energy with a capacitor and making it lost with a resistor.

ACF converters may recover leakage energy stored in the transformer leakage inductance and may also achieve zero-volt switching (ZVS), which reduces the switching losses of the main switch.

As an example of this ACF converter, the Chinese Patent Application Publication No. 101572490 (Patent Document 1) describes a non-complementary control ACF. The non-complementary control ACF disclosed in Patent Document 1 does not operate the main switch and clamp switch in a complementary manner, but turns on the clamp switch once for a set period of time before the main switch is turned on and after the transformer excitation current drops to zero.

In a non-complementary control ACF, as the load current decreases, the current in the leakage inductance decreases, and the voltage drop in the voltage resonant capacitor due to the short resonant cycle between the voltage resonant capacitor and the leakage inductance becomes smaller and ZVS is not possible. In the non-complementary control ACF shown in Patent Document 1, ZVS is realized even when the output current decreases by controlling the peak current of the excitation inductance to be almost constant even when the load current decreases, while lengthening the off (oscillation) period in response to the decrease in load current.

However, the power conversion device described in Patent Document 1 controls the excitation inductance current to be constant, which causes a decrease in energy consumption under light loads, resulting in a longer off period and a problem of frequency drop to the audible range. Therefore, it may be necessary to decrease the excitation inductance current in response to the load current to reduce the operating frequency.

SUMMARY

The active clamp flyback converter according to one or more embodiments may include a first series circuit in which a main switch and a primary winding are connected in series at both terminals of a DC power supply, a second series circuit in which a clamp switch and a clamp capacitor are connected in series at both terminals of the primary winding, a transformer having a secondary winding electromagnetically coupled with the primary winding, a controller for turning on/off the main switch and the clamp switch, a rectifier smoothing circuit for rectifying and smoothing the voltage of the secondary winding, and an output voltage detector for detecting the output voltage of the rectifier smoothing circuit. The controller has a first drive signal to turn on/off the main switch, a second drive signal to turn on/off the clamp switch during the period when the main switch is off, and a third drive signal to turn on/off the clamp switch after the second drive signal. The controller controls the first off period during which both the main switch and clamp switch are off from the off time of the first drive signal to the on time of the second drive signal, and the second off period during which both the main switch and clamp switch are off from the off time of the second drive signal to the on time of the third drive signal.

DETAILED DESCRIPTION

Figure 1:
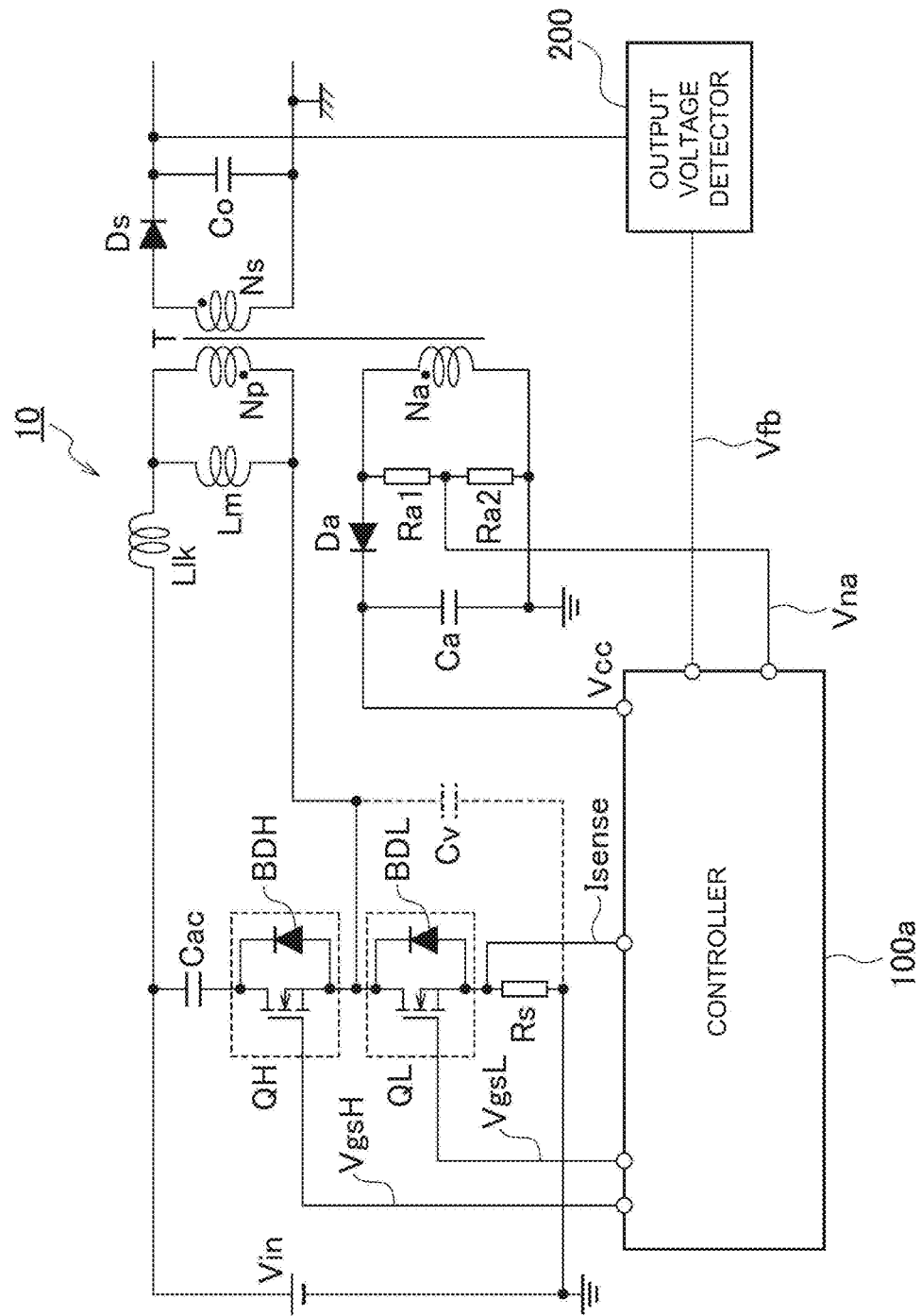
FIG. 1 is a diagram illustrating a configuration of an ACF converter according to a first embodiment.

The active clamp flyback converter (ACF converter 10) according to one or more embodiments is described in detail below with reference to the drawings. The same or equivalent parts in the figures of the drive circuits for each example may be marked with the same symbols and their descriptions are omitted. According to one or more embodiments, the active clamp flyback converter may be equivalent to the ACF converter 10.

One or more embodiments relates to the ACF configuration and its control method in ACF control (hybrid ACF control) where the clamp switch QH (see FIG. 1) is turned on and off twice during while the main switch QL (see FIG. 1) of the ACF converter 10 is turned off.
(ACF Converter)

A flyback converters is one of the power circuit topologies of isolated DC-DC converters. In a flyback converter, when the main switch is on, current flows through the primary winding of the transformer and energy is stored in the transformer inductance. Then, when the main switch is off, the energy stored in the excitation inductance is extracted from the secondary winding of the transformer, and power is transferred from the primary side to the secondary side.

However, there is uncoupled leakage inductance in the primary and secondary windings of the transformer. In a flyback converter, current also flows through the leakage inductance when the main switch is on, and energy is stored.

The leakage energy stored in the leakage inductance cannot transmit leakage energy from the secondary winding to the secondary side because the reverse electromotive force is not generated in the direction to conduct the rectifier connected to the secondary winding after the main switch is turned off. Therefore, the reverse electromotive force of the leakage inductance generates a high surge voltage at both terminals of the turned-off main switch, which may destroy the main switch.

For example, if a MOSFET is used as the main switch, if this surge voltage exceeds the withstand voltage of the MOSFET, it may cause an avalanche breakdown and destroy the MOSFET. Normally, an RCD snubber circuit consisting of a capacitor, resistor, and diode is connected to both terminals of the transformer primary winding to suppress the surge voltage.

The RCD snubber circuit suppresses surge voltage by recovering leakage energy with a capacitor and dissipating it with a resistor. Therefore, one of the challenges in improving efficiency in flyback converters is the recovery of leakage energy.

Another issue for high efficiency in flyback converters is the reduction of switching losses. For example, when a MOSFET is used as the main switch in a flyback converter, a MOSFET parasitic capacitance Coss exists between the drain and source of the MOSFET. If a voltage Vds (0) exists at both terminals of the drain and source when the MOSFET turns on, the parasitic capacitance Coss has $\frac{1}{2}$ Coss×Vds $(0)^2$ of energy is stored.

When a MOSFET turns on, the energy is lost in the on resistance of the MOSFET. The zero-volt switching (ZVS), which sets the voltage at both terminals of the switch to zero volts when the switch turns on, is known as a way to reduce the switching loss. The ZVS sets the voltage Vds (0) at both terminals of the switch to zero volts when the switch turns on, Coss×Vds $(0)^2$ becomes zero, thus reducing switching losses. Therefore, ZVS is an issue for high efficiency in flyback converters.

Active clamp flyback converters (ACF converters), in which the RCD snubber circuit include a clamp switch and a clamp capacitor, have been proposed to improve for the efficiency.

The first advantage of an ACF converter is that it may recover the leakage energy stored in the leakage inductance of the transformer. The second advantage of the ACF converter is that it may realize ZVS of the main switch. Therefore, the ACF converter is an effective topology for high efficiency power circuits.

Leakage energy recovery in the ACF converter transfers the leakage energy accumulated while the main switch is turned on to a clamping capacitor once the main switch is turned off. When the clamp switch is turned on, the energy transferred to the clamp capacitor is applied to the primary winding of the transformer. The voltage applied to the primary winding is in the direction of conducting the diode connected to the secondary winding, so the leakage energy may be recovered to the output.

In addition, ZVS must discharge the capacitance components that are equivalently connected to both terminals of the main switch. The capacitance component may be equivalent to, for example, the respective Coss when the main switch and clamp switch are MOSFETs, their coupling capacitance when the rectifier on the secondary side is a diode, or the inter-winding capacitance of a transformer.

In the ACF converter, by turning on the clamp switch, the voltage of the clamp capacitor may be applied to the primary winding of the transformer in the opposite direction of the supply voltage, allowing a negative current to flow through the excitation inductance and the leakage inductance. The negative current flowing through the excitation inductance and the leakage inductance may discharge the voltage resonant capacitor, enabling ZVS.

However, in the ACF converter, when the clamp switch is turned on, resonance occurs with a resonant cycle Tcalk of the leakage inductance and clamp capacitor, and the difference between the resonance current and the excitation current flows as the secondary side current from the secondary winding. Therefore, various issues arise in the relationship between the resonant cycle Tcalk and the ON period of the clamp switch.

The ACF converter 10 according to one or more embodiments may eliminate the problems described above and, moreover, may reduce the operating frequency fluctuations associated with changes in output voltage and output current to maintain zero-volt switching operation.

First Embodiment

Figure 2:
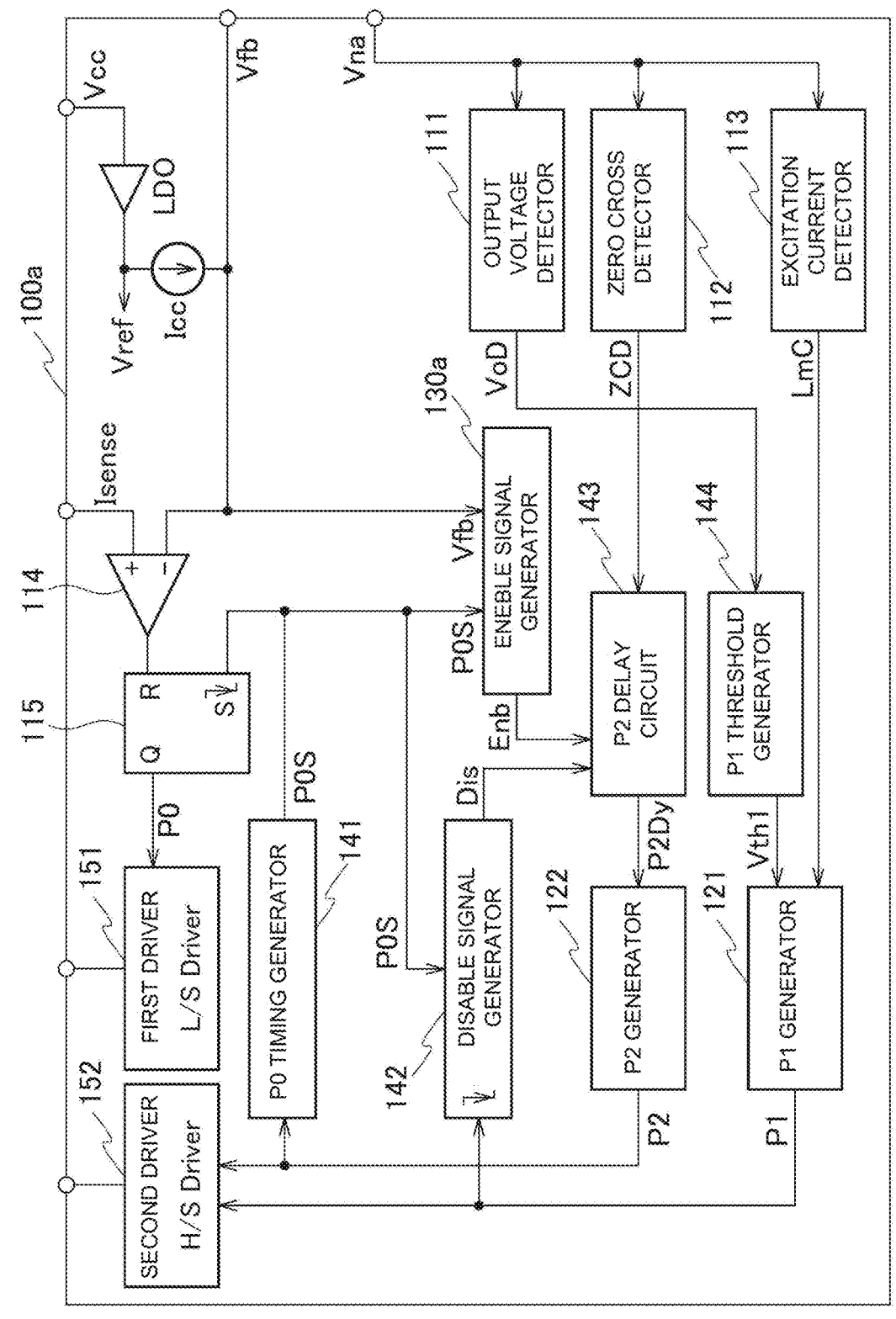
FIG. 2 is a diagram illustrating an example of the controller configuration of an ACF converter for the first embodiment.

FIG. 1 shows the configuration of the ACF converter 10 according to the first embodiment. FIG. 2 also shows a block diagram of the controller 100a, which controls ACF converter 10. The controller 100a may correspond to a control IC.

The ACF converter 10 according to the first embodiment includes a first series circuit in which the main switch QL and the primary winding Np of the transformer T are connected in series at both terminals of the DC power supply Vin. The ACF converter 10 also includes a second series circuit in which a clamp switch QH and a clamp capacitor Cac are connected in series at both terminals of the primary winding Np.

The main switch QL and clamp switch QH are made of MOSFET (Metal Oxide Semiconductor Field Effect Transistor) and have body diodes BDL and BDH between drain and source, respectively.

The MOSFET has a parasitic capacitance Coss between drain and source, and the capacitance appears in the resonant operation. To simplify the explanation of the operation, FIG. 1 shows an example in which the parasitic capacitance Coss is connected to both terminals of the main switch QL as a voltage resonant capacitor Cv, but it may not be necessary to add a capacitor besides the parasitic capacitance Coss in the MOSFET.

The MOSFET has an output capacitance Coss between drain and source, and the capacitance appears in the resonant operation. For convenience in explaining the operation, a voltage resonant capacitor (Cv) is included at both terminals of the main switch QL in FIG. 1. The voltage resonant capacitor (Cv) may be the output capacitance Coss of the MOSFET, or a separate capacitor may be added.

The main switch QL and clamp switch QH may be compound semiconductor switch elements such as GaN (gallium nitride) or SiC (silicon carbide). The main switch QL and clamp switch QH may be composed of IGBTs (Insulated Gate Bipolar Transistors). If the element structure does not have a body diode, it may be replaced by adding BDL and BDH separately, and the main switch QL and clamp switch QH are MOSFETs for convenience in explaining.

In addition, the ACF converter 10 includes a transformer T having a primary winding Np and a secondary winding Ns electromagnetically coupled to the primary winding Np. The transformer T has an excitation inductance Lm and a leakage inductance Llk in the primary winding Np, so that the coupling factor between the primary winding Np and the secondary winding Ns is less than 1. A rectifier Ds and an output capacitor Co are connected in series at both terminals of the secondary winding Ns, and a first rectifier circuit is connected to rectify and smooth the voltage of the secondary winding Ns. The first rectifier circuit may correspond to a rectifier smoothing circuit.

Furthermore, the transformer T has an auxiliary winding Na, and a second rectifier circuit with a rectifier Da and a capacitor Ca connected in series is connected to both terminals of the auxiliary winding Na.

The ACF converter 10 includes an output voltage detector 200 that detects the output capacitor voltage, a winding voltage detector that detects the winding voltage, and an Id detector Rs that detects the current in the main switch QL.

Furthermore, the ACF converter 10 includes a controller 100a that controls the main switch QL and the clamp switch QH. The controller 100a controls the main switch QL and the clamp switch QH based on the Vfb signal detected by the output voltage detector 200, the voltage Vcc detected by the winding voltage detector and the ISense signal, which is the output signal detected by Id detector Rs. Specifically, the controller 100a turns the main switch QL on and off and turns the clamp switch QH on and off twice by the first and second pulses while the main switch QL is turned off.

The controller 100a includes a current source Icc and generates a Vfb signal indicating the feedback voltage by the output signal of the output voltage detector 200. The controller 100a also includes a comparator 114 that compares the ISense signal with the Vfb signal.

The comparator 114 is connected so that the output signal is turned High when the value of the ISense signal exceeds the value of the Vfb signal, and the comparator 114 outputs the HIGH signal to the R terminal of the SR-FF 115 (SR flip-flop). The P0S signal is inputted to the S terminal of the SR-FF 115, and the SR-FF 115 outputs the P0 signal that is turned High at the falling edge of the P0S signal, and is turned Low at the output of comparator 114.

The controller 100a also has the first driver 151 that receives the P0 signal and generates a signal to drive the main switch QL. The first driver 151 controls the output voltage to a certain voltage by controlling the on-width of the drive signal VgsL to the main switch QL. The drive signal VgsL may correspond to the first drive signal.

Furthermore, the controller 100a has an output voltage detector 111 that receives the auxiliary winding voltage Vna, generates a VoD signal indicating a voltage proportional to the output voltage, and outputs it to the P1 threshold generator 144. The VoD signal may correspond to a second voltage signal.

The controller 100a also has a zero cross detector 112 that receives the auxiliary winding voltage Vna and outputs a ZCD signal, a pulse signal that detects the zero voltage at which the voltage of the auxiliary winding Na changes from negative to positive voltage, to the P2 delay circuit 143. The ZCD signal may correspond to a zero cross signal.

Furthermore, the controller 100a has an excitation current detector 113 that receives the auxiliary winding voltage Vna, generates an LmC signal indicating a voltage proportional to the excitation current, and outputs it to P1 generator 121. The LmC signal may correspond to the first voltage signal.

P1 threshold generator 144 generates a threshold signal Vth1 multiplied by a preset ratio based on the VoD signal, which is the output of output voltage detector 111, so that the threshold value is the value indicated by the threshold signal Vth1, which is described below, and then output to the P1 generator 121. In other words, as the value of the VoD signal increases or decreases, the value of the threshold signal Vth1 also increases or decreases proportionally. The P1 threshold generator 144 may correspond to the first pulse threshold generator.

P1 generator 121 raises the signal P1 to High based on the LmC signal of the excitation current detector 113 and the threshold signal Vth1 of the P1 threshold generator 144, and sends a signal with a preset pulse width. The P1 generator 121 may correspond to the first pulse generator.

The preset ratio in P1 threshold generator 144 and the preset pulse width in P1 generator 121 are determined as follows. The time at which the excitation current turns to zero is defined as the time tz.

The timing when the P1 signal generated by P1 generator 121 turns to High is 0.5×Tcalk to 1.22×Tcalk before the time tz. According to one or more embodiments, Tcalk indicates the resonant cycle. The P1 signal may correspond to the first pulse signal.

The timing at which the P1 signal turns to Low shall be before the time tz. Furthermore, the pulse width of the P1 signal shall be 0.5×Tcalk or more. The threshold signal Vth1 of the P1 threshold generator 144 and the pulse width of the P1 generator 121 are defined so that a P1 signal with such a pulse width is generated.

With the above settings, even if the output voltage changes, the timing at which the P1 signal turns to High is before 0.5×Talk to 1.22×Tcalk and the timing at which the P1 signal turns to Low is before the time tz when the excitation current becomes zero. If the output voltage does not change, the threshold signal Vth1 may be a predetermined threshold voltage so that the timing is as explained above. The predetermined threshold voltage may correspond to the third voltage signal.

In addition, the controller 100*a* includes a disable signal generator 142. The disable signal generator 142 is made high by the POS signal, receives the P1 signal, and outputs the disable signal Dis, which becomes low after a preset delay time, to the P2 delay circuit 143.

The controller 100*a* also includes the P2 delay circuit 143. The P2 delay circuit 143 is reset by the POS signal and outputs an Enb signal, a pulse signal based on the Vfb signal indicating the feedback voltage, to the P2 delay circuit 143.

The P2 delay circuit 143 receives the Dis signal, the Enb signal, and the ZCD signal, and outputs the P2Dy signal to the P2 generator 122, triggered by the ZCD signal when the Dis signal is Low and the Enb signal is High. The P2 delay circuit 143 may correspond to a second pulse delay circuit.

Furthermore, the controller 100*a* includes the P2 generator 122 that receives the P2Dy signal and outputs a P2 signal with a preset pulse width to the second driver 152. The P2 generator 122 may correspond to a second pulse generator. The P2 signal may also correspond to the second pulse signal.

The controller 100*a* also includes the second driver 152 that receives the P1 and P2 signals and outputs the drive signal VgsH to drive the clamp switch QH of the ACF converter 10 twice. The first drive signal VgsH is output based on the P1 signal. The second drive signal VgsH is output based on the P2 signal. The first drive signal VgsH may correspond to the second drive signal, and the second drive signal VgsH may correspond to the third drive signal.

Figure 3:
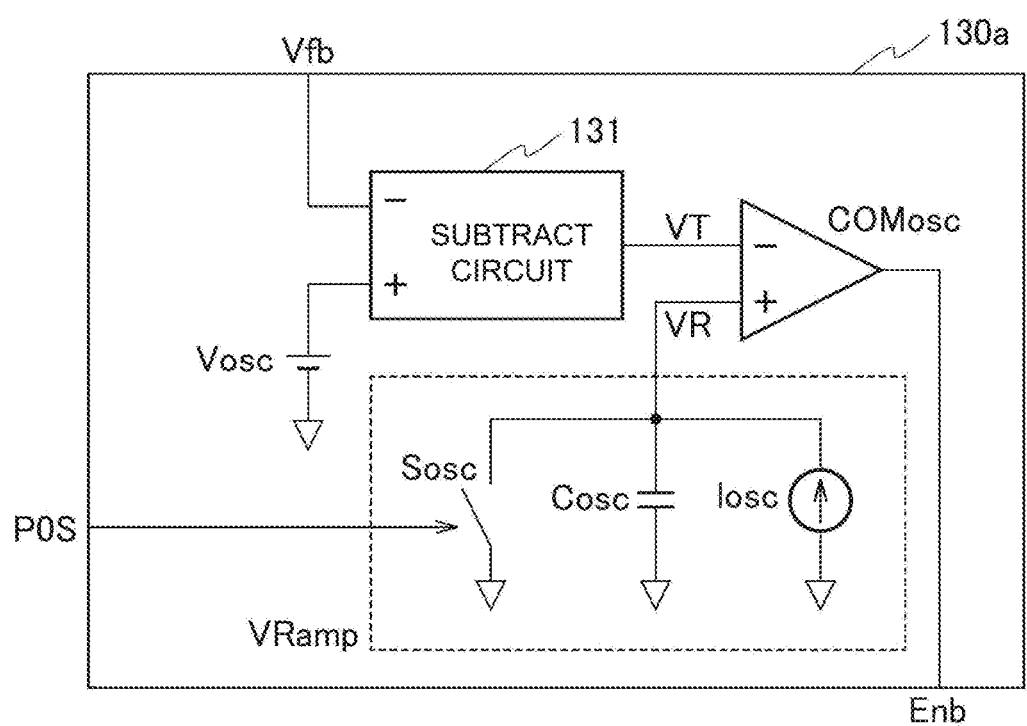
FIG. 3 is a diagram illustrating an example of an enable signal generator configuration of an ACF converter according to a first embodiment.

FIG. 3 shows the configuration of the enable signal generator 130*a* of the controller 100*a* according to the first embodiment. The enable signal generator 130*a* includes a reference voltage Vosc and a subtract circuit 131 that outputs a voltage VT subtracted from the reference voltage Vosc by the value of the Vfb signal, which indicates the feedback voltage.

The enable signal generator 130*a* also includes a VRamp circuit, which has a reference current Iosc, a capacitor Cosc charged by the reference current Iosc, and a switch Sosc that resets the capacitor Cosc, each connected in parallel.

In the VRamp circuit, when the POS signal turns to Low, the reference current Iosc charges the capacitor Cosc to generate the ramp voltage VR. The enable signal generator 130*a* also has a comparator COMosc with VT connected to the − terminal (negative terminal) and the lamp voltage VR connected to the + terminal (positive terminal), and sends an Enb signal, which is a pulse signal that turns to High when the lamp voltage VR exceeds the voltage VT.

Figure 4:
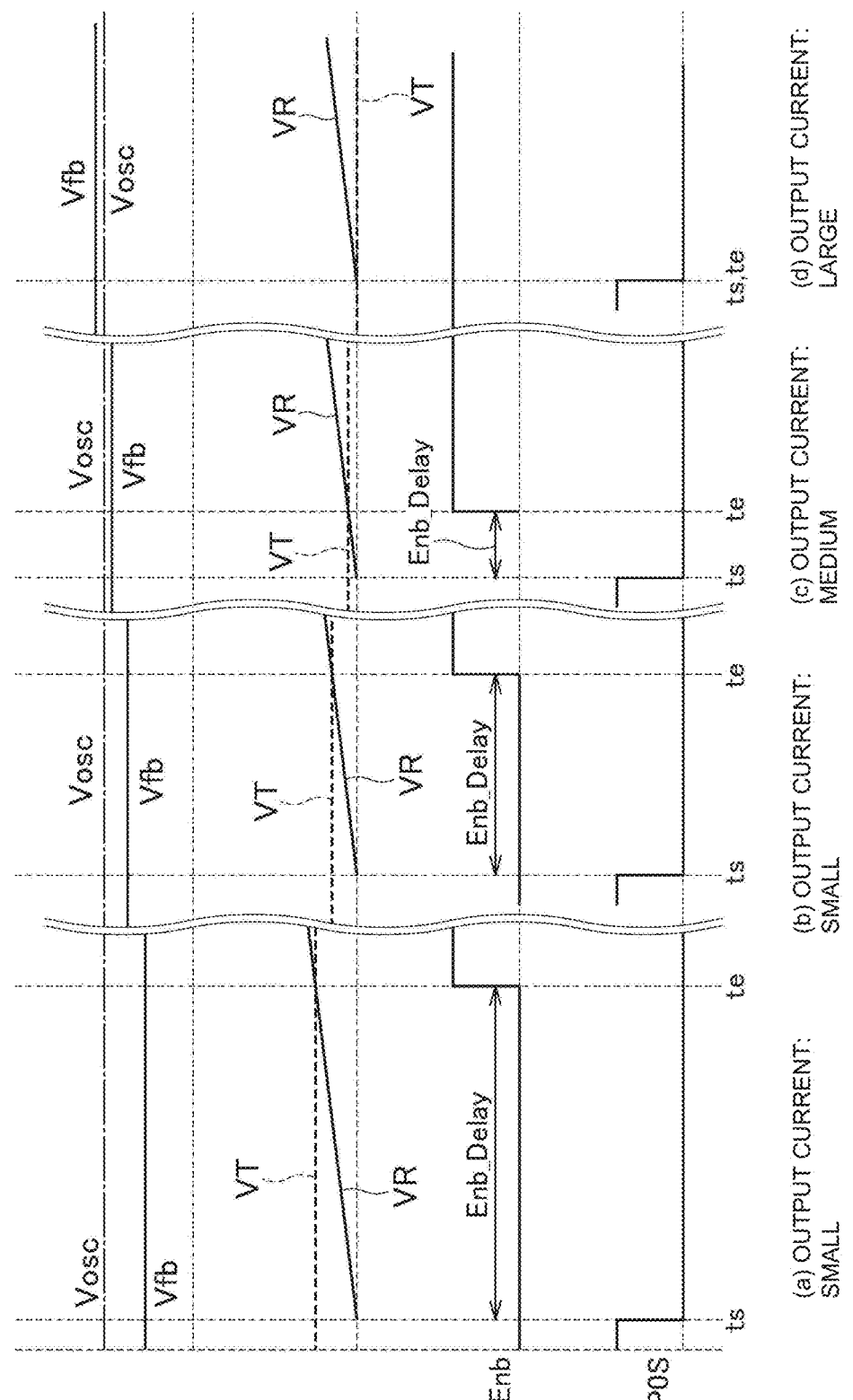
FIG. 4 is a diagram illustrating an operating waveforms of an enable signal generator according to a first embodiment.

FIG. 4 shows the operating waveform of the enable signal generator 130*a*.

In FIG. 4, the periods (a) to (d) show the operating waveforms when the output current increases as one moves to the right in the drawing. In the example shown in FIG. 4, the configuration of the output voltage detector 200 and the controller 100*a* indicates that the value of the Vfb signal increases as the output current increases.

Since the reference current Iosc is a preset current source, the slope of the ramp voltage VR is shown in FIG. 4 to be constant and increasing. As the output current increases, the value of the Vfb signal increases, and as the difference from the reference voltage Vosc decreases, the voltage VT decreases, so the time until the Enb signal turns to High becomes shorter. When the value of the Vfb signal becomes higher than the reference voltage Vosc, the Enb signal turns to High when the POS signal turns to Low.

Figure 5:
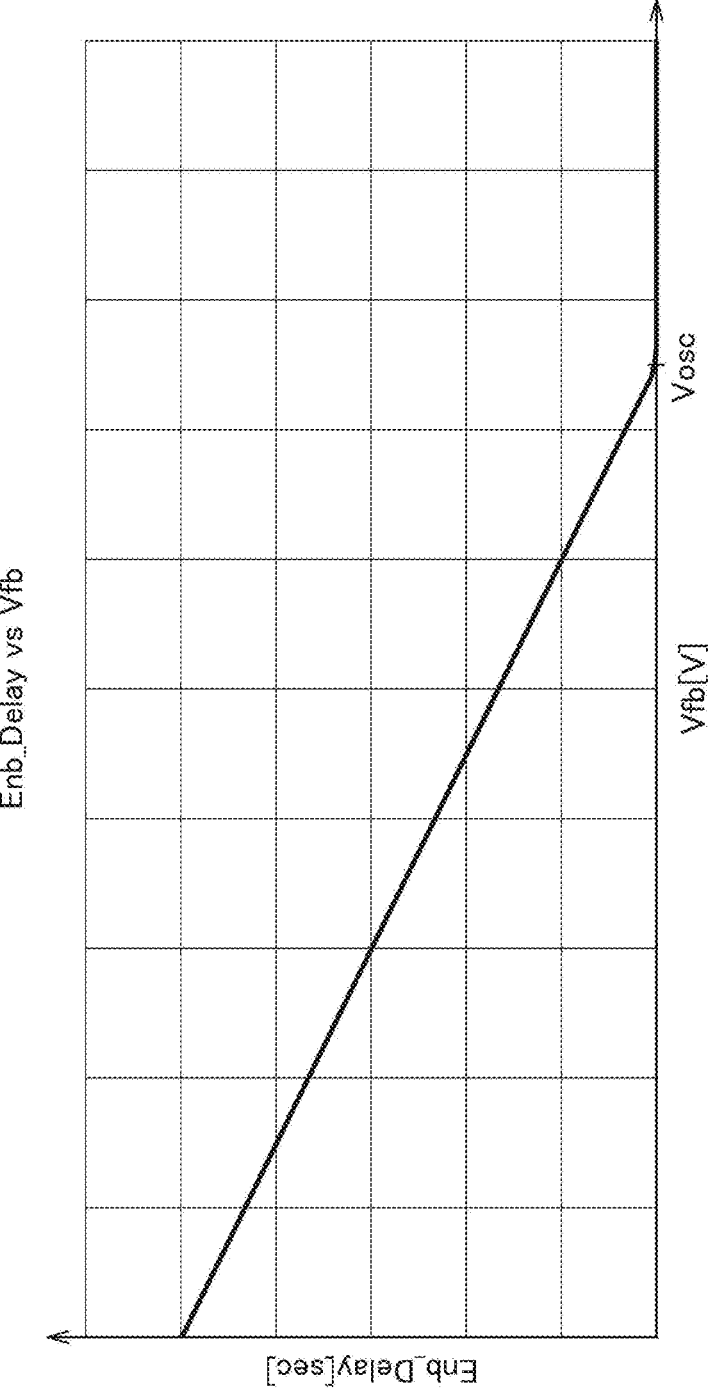
FIG. 5 is a diagram illustrating a characteristics of an enable signal generation method according to a first embodiment.

FIG. 5 shows the characteristics of the enable signal generator 130*a* in FIG. 3. The horizontal axis is the value of the Vfb signal, which indicates the feedback voltage, and the vertical axis is Enb_Delay, the time from when the switch Sosc is turned off until the Enb signal turns to High.

As mentioned above, the reference current Iosc is a preset current source, and the slope of the ramp voltage VR is constant and increasing. The voltage VT is the difference between the preset reference voltage Vosc and the value of the Vfb signal. Therefore, as shown in FIG. 5, the characteristics of the enable signal generator 130*a* are controlled so that the time Enb_Delay from the switch Sosc turning off until the Enb signal becomes High is proportional to the negative value of the Vfb signal with respect to the Vfb signal. The time Enb_Delay is shown in EQ. (1) below. The values a and b are those that satisfy the conditions a<0 and b>0, and are shown in EQ. (2) and EQ. (3) below.

$$Enb\_Delay = a \times Vfb + b \qquad \text{EQ. (1)}$$

$$a = -\left(Cosc/Iosc\right) \qquad \text{EQ. (2)}$$

$$b = Cosc \cdot \left(Vosc/Iosc\right) \qquad \text{EQ. (3)}$$

FIGS. 6A to 6D show the operating waveforms of the ACF converter 10 according to the first embodiment. In FIGS. 6A to 6D, the operating waveforms are shown when the output current decreases as we proceed from FIGS. 6A to 6D. The value of the Vfb signal, which indicates the feedback voltage, decreases as the output current decreases by the configuration of the output voltage detector 200 and the controller 100*a*.

Figure 6A:
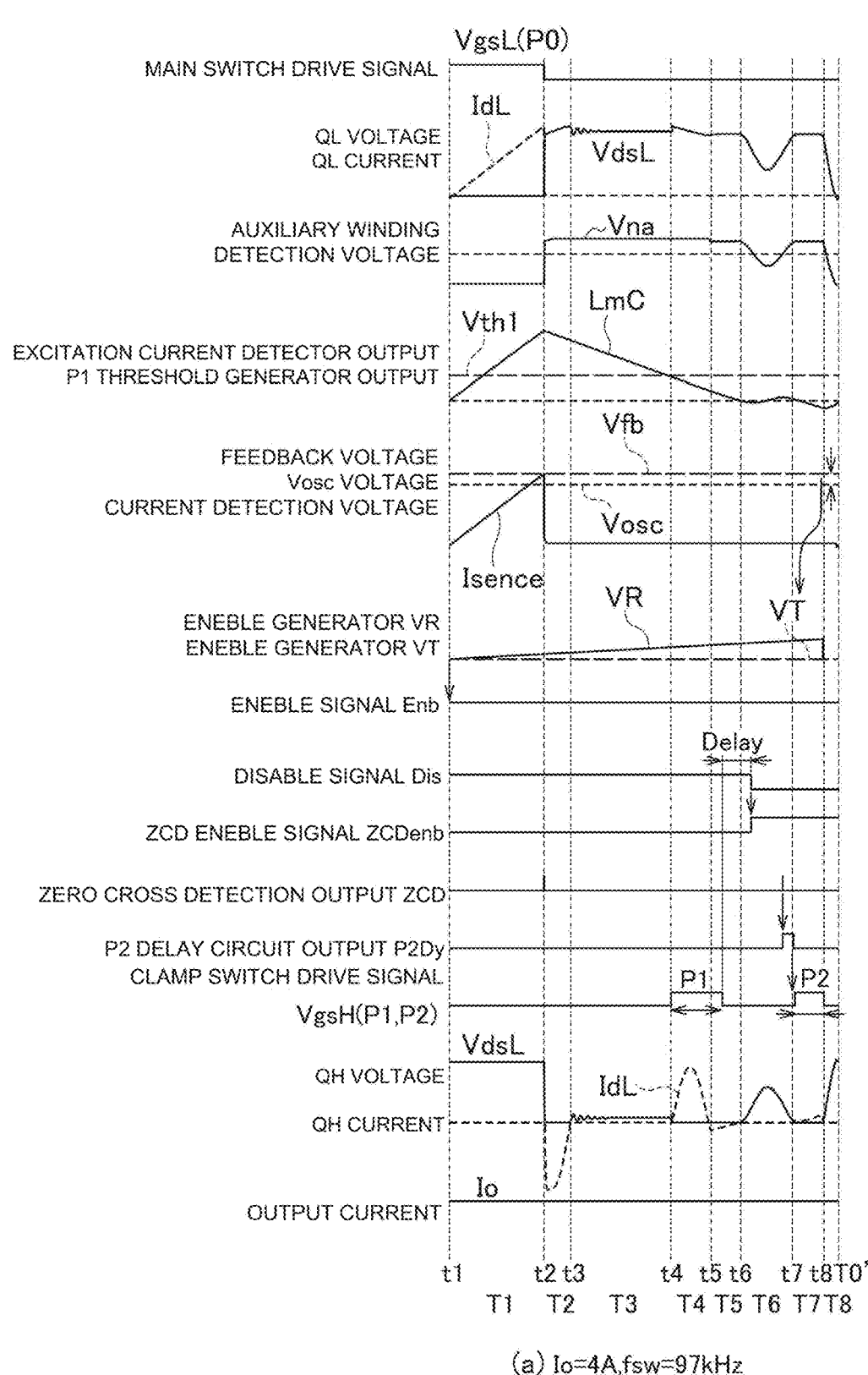
FIG. 6A is a diagram illustrating an example of an operating waveform of an ACF converter according to a first embodiment.

FIG. 6A shows an example of the operating waveforms when the output current is high and the value of the Vfb signal is higher than the reference voltage Vosc.

In the period T1, the POS signal goes from High to Low at time t1, and the SR-FF 115 is set. When the P0 signal turns to High, the drive signal VgsL turns to High, and the main switch QL turns on, the current of the main switch QL increases and the value of the ISense signal rises.

When the value of the ISense signal reaches the value of the Vfb signal at time t2, the output of comparator 114 turns to High, the SR-FF 115 is reset, the P0 signal turns to Low, the drive signal VgsL turns to Low, and the main switch QL is turned off.

In the period T1, the DC power supply Vin is connected to a series circuit of the leakage inductance Llk and excitation inductance Lm, so Itran, the current in the primary winding Np of transformer T, is shown in EQ. (4) below and increases over time. In addition, both the leakage inductance Llk and the excitation inductance accumulate a current of Itran.

$$Itran \text{ is } Itran = \left\{Vin/(Lm + Llk)\right\} \times t \qquad \text{EQ. (4)}$$

The auxiliary winding voltage Vna is negative in proportion to the input voltage.

Figure 7:
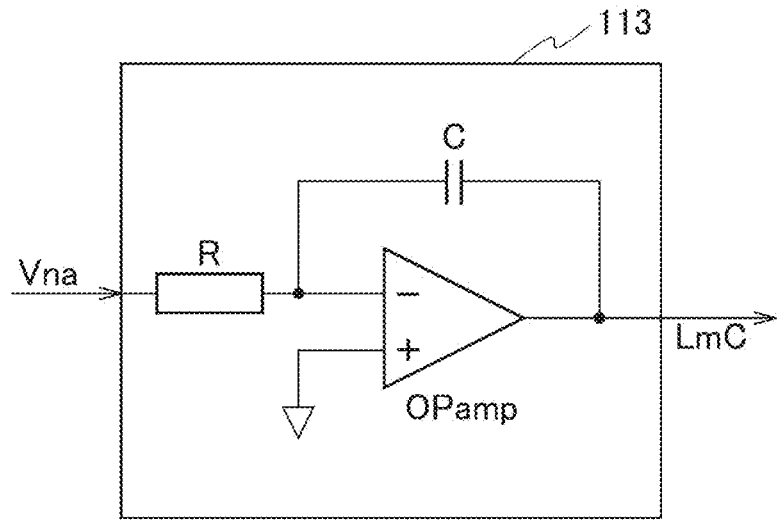
FIG. 7 is a diagram illustrating a configuration of an excitation current detector.

FIG. 7 shows the excitation current detector 113 configured with an operational amplifier. If configured with an integrating circuit as shown in FIG. 7, the auxiliary winding voltage Vna is integrated, and the excitation current detector 113 outputs an LmC signal indicating a voltage proportional to the excitation current.

In the examples shown in FIGS. 6A through 6D, the auxiliary winding voltage Vna zero-crosses from negative to positive at time t2.

In FIG. 6A, the voltage VT of the enable signal generator 130a is zero because the value of the Vfb signal is higher than the reference voltage Vosc, and the Enb signal indicating enable is High. However, the output of The P2 delay circuit 143 remains zero because the Dis signal indicating disable is High.

In the period T2, when the main switch QL is turned off at time t2, the energy stored in the excitation inductance Lm and the leakage inductance Llk generates a reverse voltage.

Since the leakage inductance Llk is not coupled to the secondary winding Ns, it is not output from the secondary winding Ns to the first rectifier circuit and is charged to the clamp capacitor Cac along with part of the energy of the excitation inductance Lm.

On the other hand, since the excitation inductance Lm is an inductance coupled with the secondary winding Ns, its counter electromotive voltage is generated in the direction of conducting the rectifier Ds, a diode connected to the secondary winding Ns of the transformer T. The remainder of the energy of the excitation inductance Lm, which is charged to the clamp capacitor Cac, is output to the first rectifier circuit. When all the leakage energy is charged to the clamp capacitor Cac at time t3, all the energy of the excitation inductance Lm is output to the secondary side.

In related complementary control, the clamp switch QH is turned on in the period T2, but the ACF converter 10 according to one or more embodiments differs from the related complementary control in that the clamp switch QH is not turned on in the period T2.

However, as the load current decreases and the value of the Vfb signal decreases, the period T1 becomes shorter. As a result, when the maximum value of the LmC signal approaches the value of the threshold signal Vth1, the clamp switch QH may turn on in the period T2. However, such operation may also be included in the scope of one or more embodiments.

In the period T3, the energy stored in the leakage inductance Llk at time t3 is zero, and the energy stored in the excitation inductance Lm is output from the secondary winding Ns to the first rectifier circuit.

In the periods T2 and T3, the energy stored in the excitation inductance Lm is output from the secondary winding Ns to the first rectifier circuit, so the auxiliary winding voltage Vna has a voltage proportional to the output voltage and the output of the excitation current detector 113 decreases in proportion to the excitation current.

In the period T4, at time t4, P1 generator 121 turns on clamp switch QH when the value of the LmC signal decreases and becomes equal to the value of the threshold signal Vth1.

Since the energy of the excitation inductance Lm is output to the secondary side, when the clamp switch QH is turned on, a resonant current flows between the clamp capacitor Cac and the leakage inductance Llk.

Therefore, P1 generator 121 has an on-width of ½ or more of Talk, which indicates the resonant cycle between the clamp capacitor Cac and the leakage inductance LlK. The time t6 when the excitation current becomes zero is set as time tz, and the P1 threshold generator 144 sets the threshold signal Vth 1 so that the P1 signal is turned off between (tz−0.72 Tcalk) and time tz, and the P1 generator 121 sets the pulse width of the P1 signal.

In the period T5, ½ Tcalk time after clamp switch QH is turned on, the resonance current is limited by the excitation current and flows through clamp switch QH to the clamp capacitor Cac. By generating the P1 signal and turning on clamp switch QH as described above, no resonant current flows when clamp switch QH is turned on for the second time.

In the period T5, current flows from the source to the drain direction of clamp switch QH.

The P1 signal is generated under the conditions described above, so the P1 signal turns off in the period T5. Even though clamp switch QH turns off during the period, the current path does not change because the current is diverted to body diode BDH after it turns off. The period T5 ends when the excitation current reaches zero at the time t6.

In the period T6, the excitation current becomes zero at the time t6, but since the clamp switch QH is off, the excitation current does not flow in the negative direction as in complementary control. Therefore, resonance occurs between the voltage resonant capacitor Cv, the excitation inductance Lm of the primary winding Np of transformer T, and the leakage inductance Llk. As a result, the voltage of the main switch QL, clamp switch QH, and each winding oscillates with its resonant cycle Tcvlm.

The disable signal generator 142 is set to turn low after a preset delay time from the off time of the P1 signal. According to one or more embodiments, the preset delay time may be set so that the first zero crossing after the excitation current becomes zero may be detected because the off time of the P1 signal is generated based on the time when the excitation current becomes zero. In the examples shown in FIGS. 6A through 6D, the delay time is set so that it is immediately after the time t6 when the excitation current goes to zero.

In FIG. 6A, the value of the Vfb signal, which indicates the feedback voltage, is higher than the reference voltage Vosc, so the voltage VT of the enable signal generator 130a is zero and the Enb signal is already High.

The P2 delay circuit 143 sends a signal with a preset pulse width by receiving the ZCD signal after the Enb signal is High and the Dis signal turns to Low. Therefore, in FIG. 6A, the signal P2Dy with a preset pulse width is output based on the ZCD signal after the Dis signal turns to Low. The signal P2Dy may correspond to the second pulse delay signal.

Here, the preset pulse width means that the pulse width of the P2Dy signal is set Tovlm/4 in advance, since the ZCD signal detects the negative to positive zero crossing of the auxiliary winding voltage Vna, which oscillates with a cycle of Tcvlm. This makes the time t7 of the edge of the pulse signal of the P2Dy signal the minimum value of the voltage at both terminals of clamp switch QH.

According to one or more embodiments, the zero cross detector 112 detects the zero crossing of the auxiliary winding voltage Vna from negative to positive and the P2Dy signal is Tcvlm/4. Zero cross detector 112 detects the zero crossing of the auxiliary winding voltage Vna from positive to negative, even if the pulse width of the P2Dy signal is (¾)×Tcvlm, the edge of the pulse signal of the P2Dy signal is at the time t7. The edge of the pulse signal of the P2Dy signal is the minimum value of the voltage at both terminals of clamp switch QH. In other words, the P2 delay circuit 143 sets the pulse width of the P2 signal depending on the polarity of the ZCD signal.

The period T7 is the period when clamp switch QH is turned on and the negative excitation current is applied. The time t7 is the edge of the P2Dy signal, and P2 generator 122 generates a signal P2 with a preset pulse width at the edge of the P2Dy signal and outputs it to the second driver 152.

Here, the preset pulse width is the energy stored by the negative current in the primary winding inductance of transformer T in the period T7, which is set so that all the energy charged in the voltage resonant capacitor Cv may be discharged.

The on timing of the clamp switch QH of the ACF converter 10 for the first embodiment is the same timing as the general noncomplementary control, but no resonant current flows. Therefore, the on-width Ton2 of the P2 signal for the voltage resonant capacitor Cv to become zero is shown in the following EQ. (5) when the voltage of the clamp capacitor Cac is Vac.

$$Ton2 = \sqrt{L_m \cdot C_{ac}} \cdot \sin^{-1}\left(\frac{1}{V_{ac}} \cdot \sqrt{\frac{C_v}{C_{ac}}} \cdot \sqrt{V_{in}^2 - V_{ac}^2}\right) \tag{5}$$

If the minimum and maximum input voltages are Vinmin and Vinmax, respectively, then Ton2max at the maximum input voltage is shown in EQ. (6) below.

$$Ton2max = \sqrt{L_m \cdot C_{ac}} \cdot \sin^{-1}\left(\frac{1}{V_{ac}} \cdot \sqrt{\frac{C_v}{C_{ac}}} \cdot \sqrt{V_{in(max)}^2 - V_{ac}^2}\right) \tag{6}$$

As a result, P2 generator 122 generates a P2 signal with a preset pulse width Ton2max at the edge of the P2Dy signal and outputs it to the second driver 152, which enables ZVS even if the input voltage drops.

The above is an example of a setting, and the on-width given by the above formula at Vintyp when the input voltage is smaller than Vinmax may be set in advance as Ton2typ. In this case, the switch turns on at the minimum point of voltage instead of ZVS when the input voltage is at its maximum value, but the negative current may be reduced, which has the advantage of higher efficiency when the input voltage is less than Vtyp.

Since the clamp capacitor voltage Vac is N=Np/Ns times the turn ratio of the output voltage Vo, Vac=N·Vo, and Ton2 is shown in EQ. (7) below.

$$Ton2 = \sqrt{L_m \cdot C_{ac}} \cdot \sin^{-1}\left(\frac{1}{N \cdot V_o} \cdot \sqrt{\frac{C_v}{C_{ac}}} \cdot \sqrt{V_{in}^2 - \left(N \cdot V_o\right)^2}\right) \tag{7}$$

Therefore, P2 generator 122 may incorporate a means to detect input and output voltages and correct Ton2 with input and output conditions for optimal ZVS, which allows the input voltage to vary to configure a highly efficient power supply.

In the period T8, the P0 timing generator 141 sends a P0S signal with a preset pulse width from the edge of the P2 signal. The period ends when the P0 signal turns to High on the edge of the P0S signal and the main switch QL turns on.

When the clamp switch QH turns off at the time t8, the voltage resonant capacitor Cv is discharged by the negative current flowing in the inductance of the primary winding Np.

The period T8 is the resonant operation between the inductance component of the primary winding Np and the voltage resonant capacitor Cv. The voltage of the main switch QL drops due to voltage resonance, and the time DT from the time the clamp switch QH is turned off to the minimum point of the resonant voltage is shown in the following EQ. (8), assuming the resonant cycle is Tcvlm.

$$DT = \left[\frac{1}{2} - \frac{1}{2\pi}\cos^{-1}\left(\frac{Vac}{Vin}\right)\right] \cdot Tcvlm \tag{8}$$

If Vac=N·Vo, Vo=20V, Vin=300V, and N=7, then DT=Tcvlm/3, and the P0 timing generator 141 sends a P0S signal with a preset pulse width of Tcvlm/3 from the edge of the P2 signal, which is ZVS.

Due to Vac=N·Vo, the P0 timing generator 141 may detect the input and output voltages and incorporate means to correct the pulse width of the P0S signal under input/output conditions for optimal ZVS, allowing the input voltage to vary to configure a highly efficient power supply.

Figure 6B:
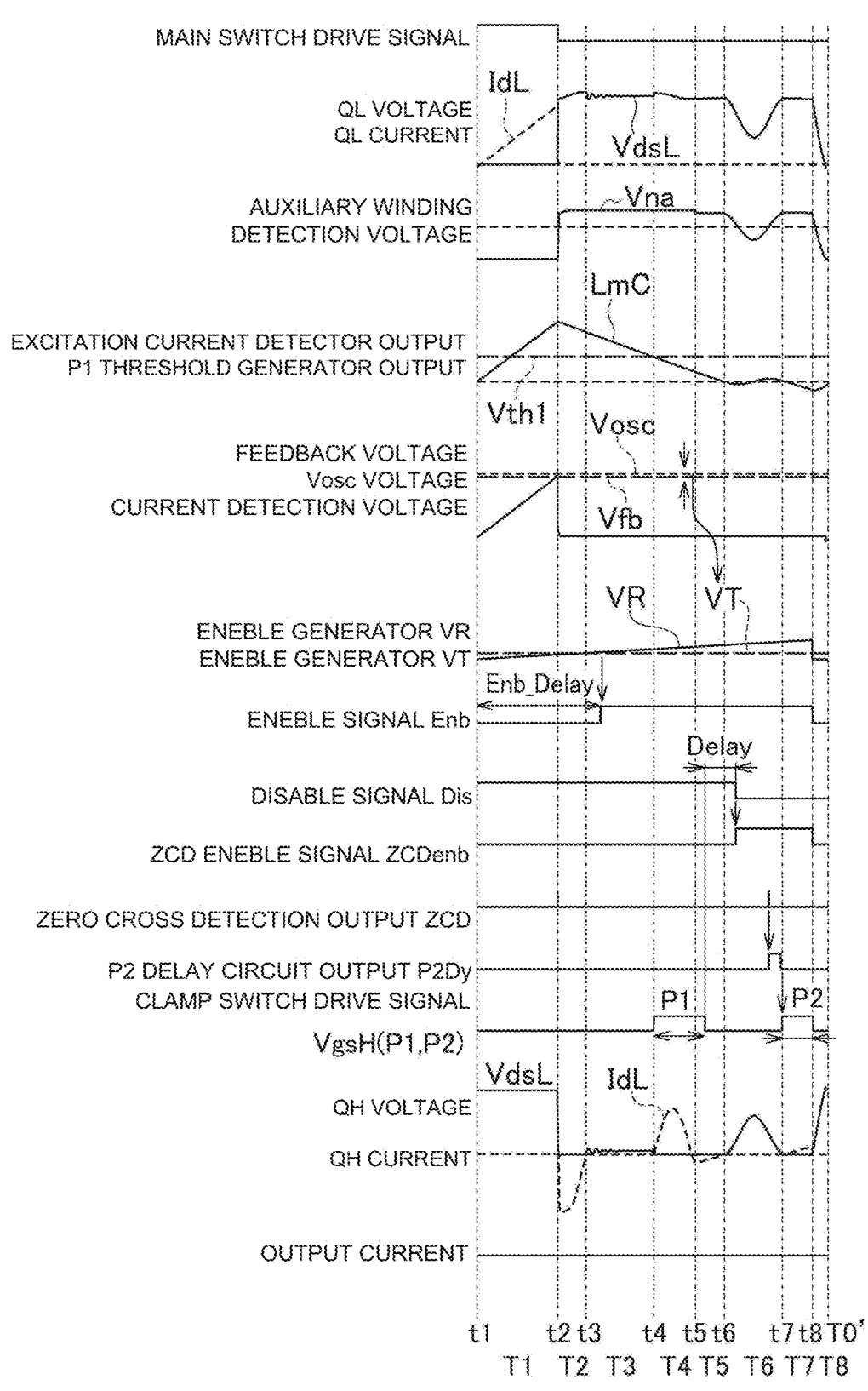
FIG. 6B is a diagram illustrating an example of the operating waveform of the ACF converter according to the first embodiment.
Figure 6C:
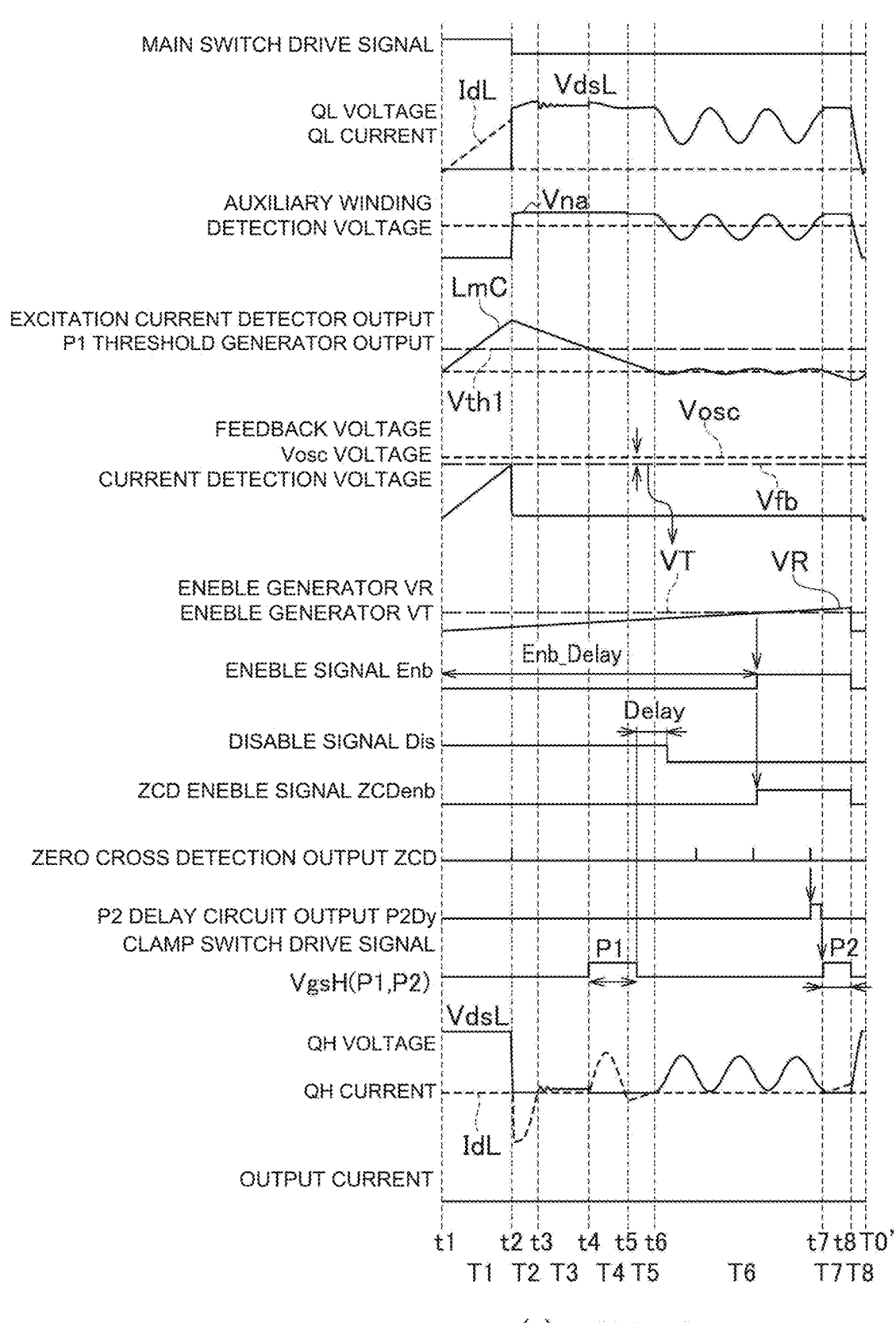
FIG. 6C is a diagram illustrating an example of the operating waveform of the ACF converter according to the first embodiment.

FIGS. 6B and 6C show an example of a case where the output current is less than in FIG. 6A and the operating waveform when the value of the Vfb signal is slightly lower than the reference voltage Vosc.

The lower value of the Vfb signal lowers the current peak of IdL and shortens the period T1. Furthermore, the peak value of the LmC signal of the excitation current detector 113 also decreases, and the period from the time t2 to the time t6, the discharge period of the excitation current, becomes shorter.

Since the value of the Vfb signal is smaller than the reference voltage Vosc, the enable signal generator 130a outputs the voltage VT based on the difference between the reference voltage Vosc and the value of the Vfb signal. In FIG. 6A, the Enb signal was High at the time t1. In FIG. 6B, the Enb signal becomes High behind the time t3, which is after the time Enb_Delay time has elapsed from the time t1. However, since the P1 signal is not sent at the time and the Dis signal is released after the P1 signal, the clamp switch QH is turned on at the timing when the voltage oscillation first reaches its maximum value after the Dis signal turns to Low in FIG. 6B.

The resonant cycle Tcvlm, the leakage inductance Llk, and the resonant cycle Talk of the clamp capacitor Cac remain the same when the output current is changed.

The period T2 is almost ¼ of Tcalk, the period T4 is ½ of Tcalk, and the period T6 is Tcvlm, which remains almost the same even if the output current changes. The pulse widths of the P2 and P0S signals and the period T5 are also the same as the preset times, but the periods T1 and T3 become shorter and the operating frequency increases.

In the example shown in FIG. 6C, the output current is even lower than in the example shown in FIG. 6B, and operating waveforms when the Vfb signal value is even lower than the reference voltage Vosc. The lower value of the Vfb signal causes the current peak of IdL to fall further, and the period T1 becomes even shorter.

However, because the value of the Vfb signal is now even smaller than the reference voltage Vosc, the enable signal generator 130a has a higher voltage VT based on the difference between the reference voltage Vosc and the value of the Vfb signal, and the Enb_Delay time increases. In addition, Enb turns to High later than the time when the Dis signal turns to Low. Therefore, based on the ZCD signal after the Enb signal turns to High, the P2Dy signal is sent and the P2 signal, which is on, is output, and in the example shown in FIG. 6C, the clamp switch QH turns on at the maximum value of the third voltage oscillation. Therefore, the periods T1 and T3 are shortened, but the period T6 is lengthened and the operating frequency is lowered.

Figure 6D:
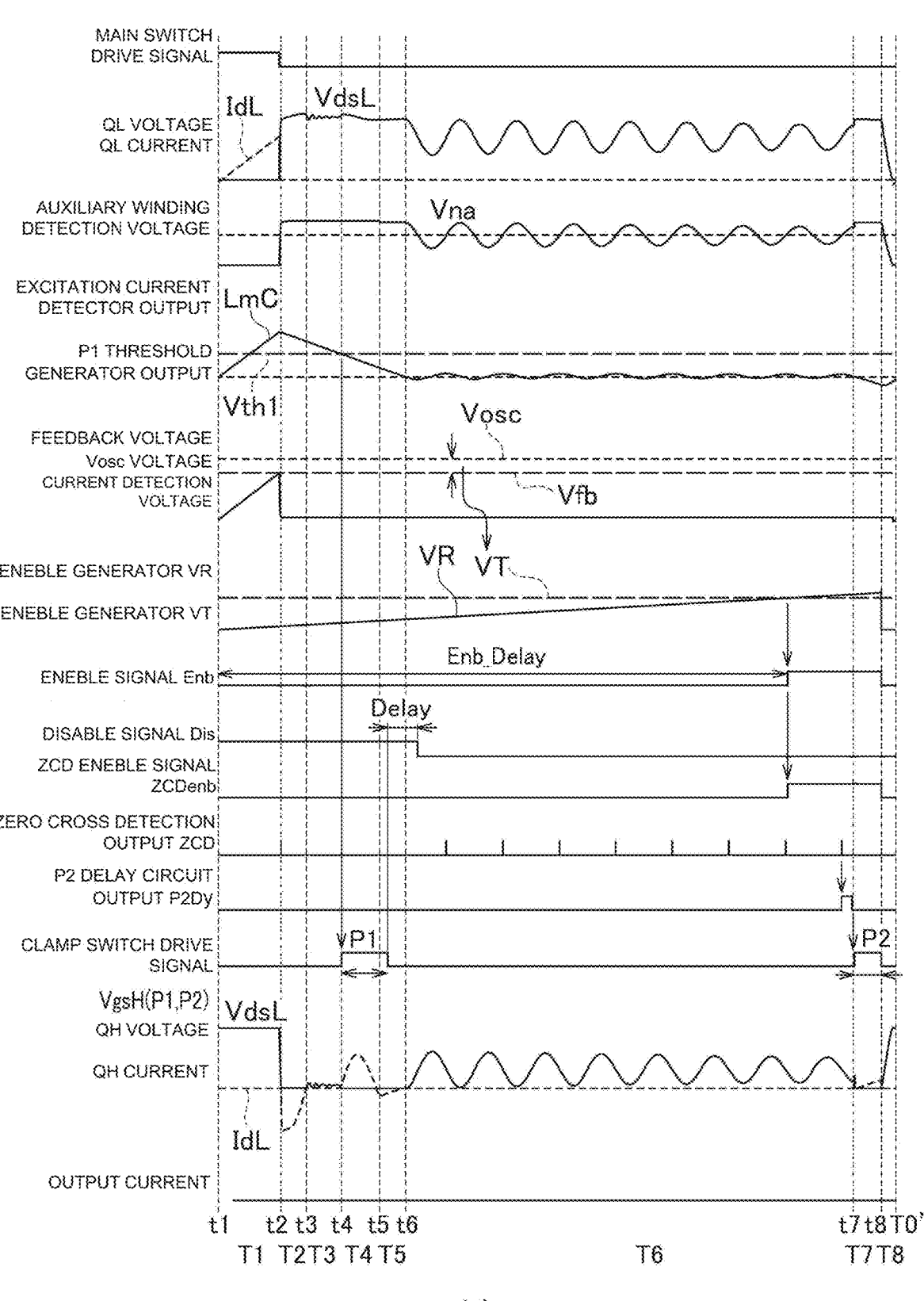
FIG. 6D is a diagram illustrating an example of the operating waveform of the ACF converter according to the first embodiment.

FIG. 6D shows an example of a case where the output current is even lower than in FIG. 6C, and the Vfb signal value is even lower than the reference voltage Vosc.

The lower value of the Vfb signal further lowers the current peak of IdL, making the period T1 even shorter, and the periods T1 and T3 shorter. However, the period T6 becomes longer and the operating frequency falls further.

As explained above, the active clamp converter and its control IC according to one or more embodiments controls the on-width of the main switch as in conventional control technology when the value of the Vfb signal decreases as the output current decreases, and also controls the first off-period from the time t2 when the main switch QL is turned off to the time t4 (on time) when the clamp switch QH is turned on. The second off period from the time t5 when clamp switch QH is turned off to the time t7 when clamp switch QH is turned on is controlled. In the first off period and the second off period, both the main switch QL and the clamp switch QH are off.

Therefore, a lower output current compared to a conventional ACF with noncomplementary control may allow frequency reduction while lowering the peak current of the IdL, thereby reducing frequency fluctuations.

The ACF converter 10 turns on the second clamp switch QH to ZVS the main switch QL, but it is not affected by the resonance current of Tcalk, which indicates the resonant cycle. Therefore, the ACF converter 10 may control the second on-width according to the input and output voltages. In other words, the ACF converter 10 according to one or more embodiments may have the advantage that ZVS is possible over a wide input range and a highly efficient and low-noise power supply may be realized.

(Variations)

Figure 8:
FIG. 8 is a diagram illustrating an example of an operating waveform when an output voltage is varied in an ACF converter according to a first embodiment.

The ACF converter 10 according to one or more embodiments proposes a control that may allow ZVS even in power supplies with variable output voltage. FIG. 8 shows the operating waveforms when the output voltage is increased or decreased without changing the output current in the first embodiment.

The state (b) in FIG. 8 is the same state as in FIG. 6B. the state (a) in FIG. 8 is the operating waveform when the output voltage is doubled. In addition, the state (c) in FIG. 8 shows the operating waveform when the output voltage is set to ½.

As the output voltage increases or decreases, the slope of the falling LmC signal, the output voltage of the excitation current detector 113, also increases or decreases in proportion to the output voltage.

However, since the P1 threshold generator 144 generates the threshold signal Vth1 by multiplying the VoD signal, which indicates the output of the output voltage detector 111, by a preset ratio, when the value of the VoD signal, the output voltage, increases or decreases, the value of the threshold signal Vth1 also increases or decreases proportionally. Therefore, P1 generator 121 turns on/off clamp switch QH at the same timing even if the value of the output voltage VoD signal changes.

In the first embodiment of enable signal generator 130a, as shown in the state (c) of FIG. 8, the output voltage becomes lower and the power to be transmitted to the secondary side becomes smaller, so Vfb becomes lower, the peak value of IdL becomes smaller, and the control adjusts the power to be transmitted to the secondary side. Also, since the value of the Vfb signal becomes lower, the Enb_Delay becomes longer.

The output voltage drop shortens the period T1 and lengthens the period T3, but the longer time Enb_Delay unnecessarily lengthens the period T6, resulting in a lower frequency. In other words, it may be desirable to have less variation in the operating frequency because a lower operating frequency requires larger components such as capacitors and transformers. Therefore, it may be desirable power supplies that require variable output voltage have less fluctuation in operating frequency.

Second Embodiment

The enable signal generator 130b (see FIG. 9) according to the second embodiment achieves control with little fluctuation in operating frequency in response to changes in output voltage, and a compact, high-efficiency power supply configuration may be realized.

Figure 9:
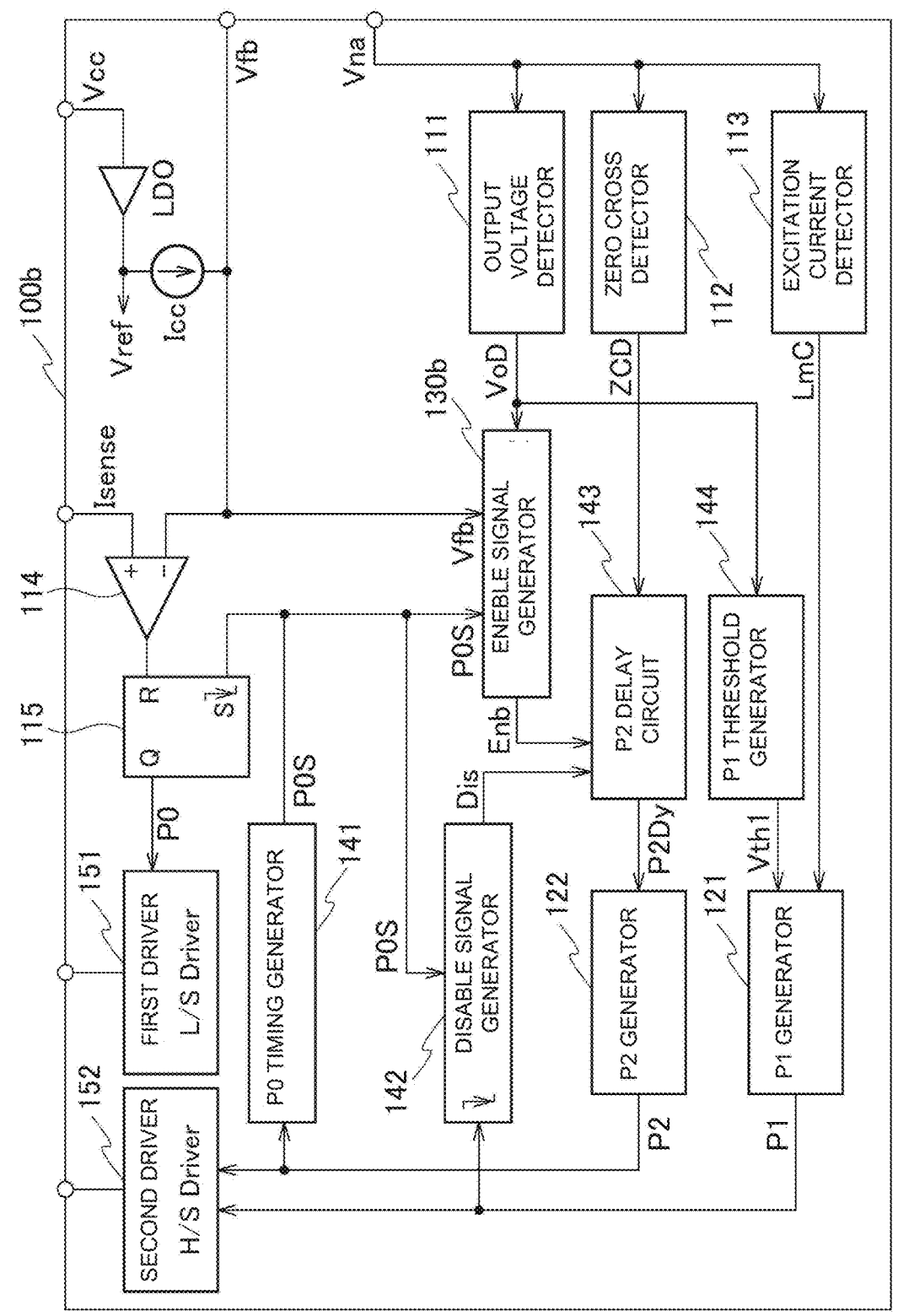
FIG. 9 is a diagram illustrating a configuration of an ACF converter according to a second embodiment.

FIG. 9 shows the configuration of the controller 100b of the ACF converter 10 according to the second embodiment. The difference from FIG. 2 is that the VoD signal is added as an input to the enable signal generator 130b. In other words, the enable signal generator 130b according to the second embodiment acquires the value of the VoD signal.

Figure 10:
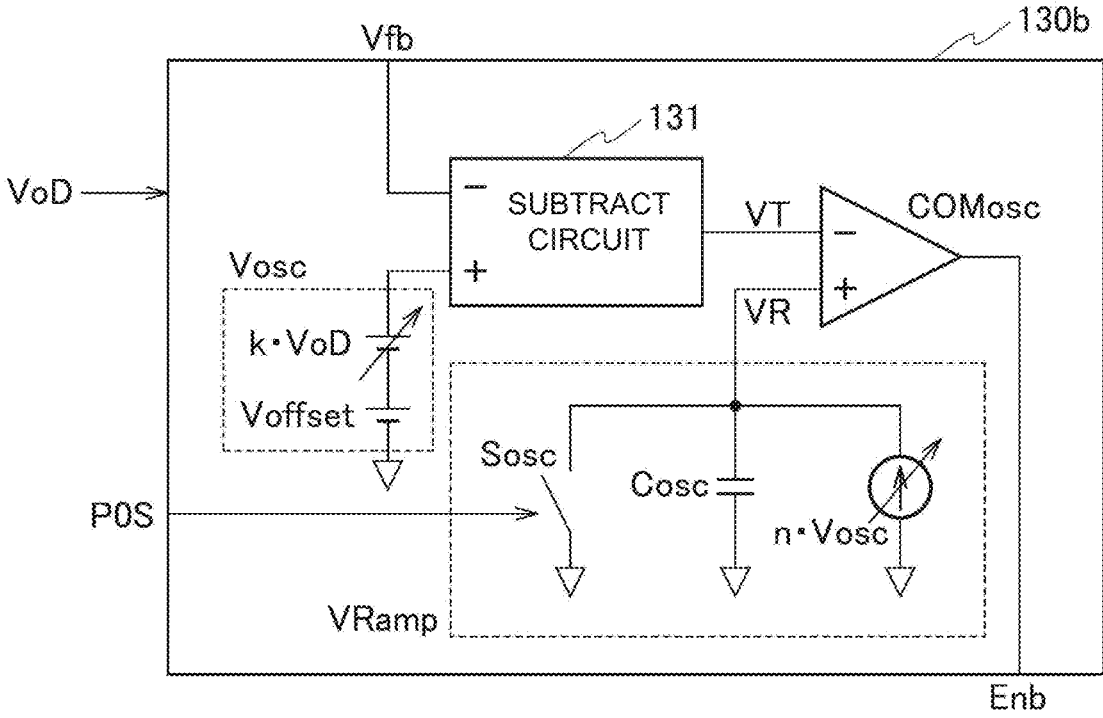
FIG. 10 is a diagram illustrating an example configuration of an enable signal generator of an ACF converter according to a second embodiment.

FIG. 10 also shows the configuration of enable signal generator 130b of the controller 100b according to the second embodiment.

The difference between the enable signal generators 130a and 130b in FIG. 10 and FIG. 3 is that the reference voltage Vosc is set as a voltage k·VoD and Voffset proportional to the value of the VoD signal. The difference between the enable signal generators 130a and 130b is that the reference current Iosc is set as a current source proportional to the reference voltage Vosc, n·Vosc=n·(k·VoD+Voffset).

The reference voltage Vosc, which is compared to the value of the Vfb signal, and the reference current Iosc are controlled by the VoD signal of the output voltage detector 111.

Figure 11:
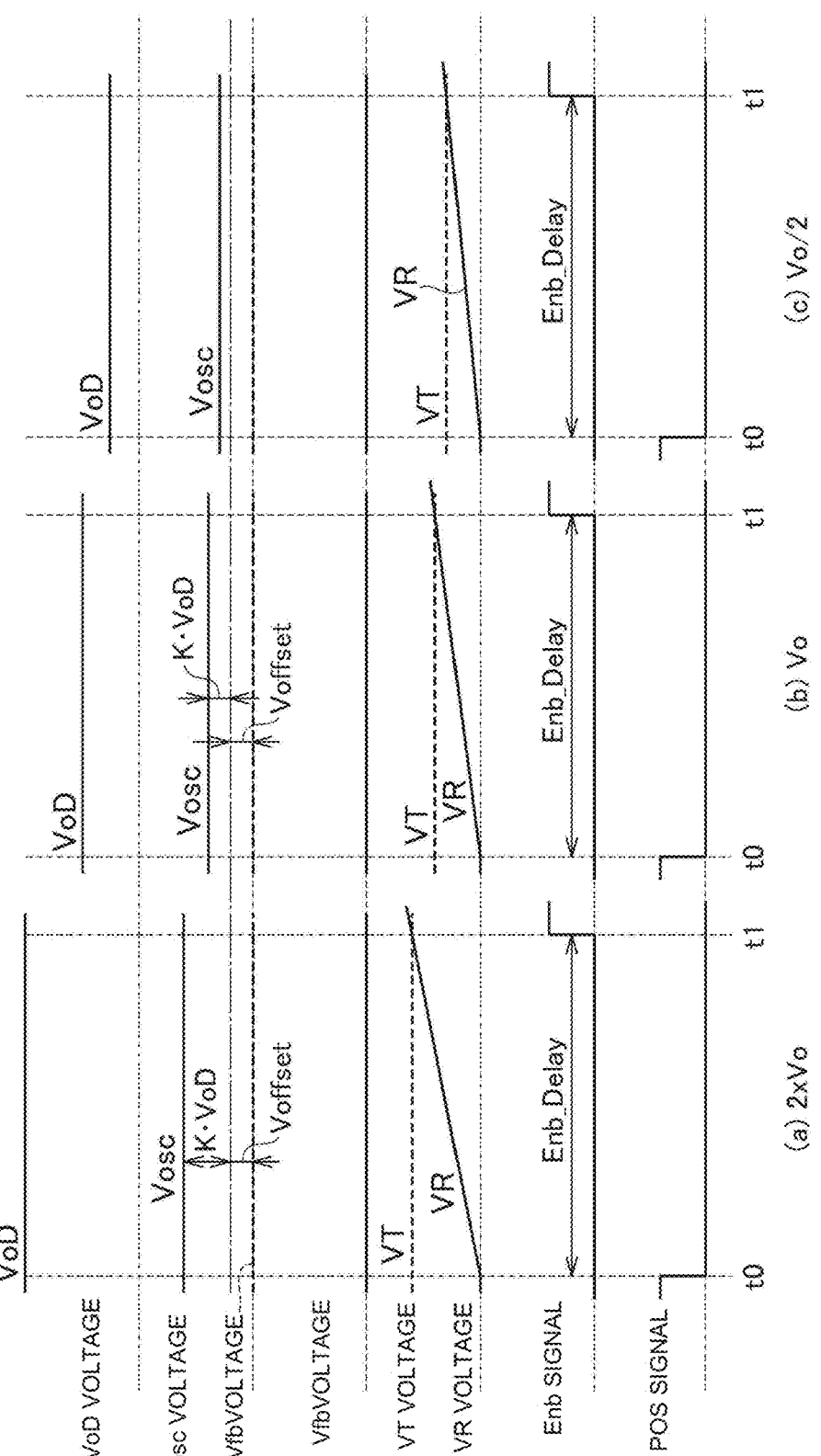
FIG. 11 is a diagram illustrating an example of an operating waveform of an enable signal generator according to a second embodiment.

FIG. 11 shows the operating waveforms of the enable signal generator of FIG. 10. The state (a) to the state (c) in FIG. 11 are the operating waveforms when the value of the Vfb signal is zero. The state (a) in FIG. 11 shows the operating waveform when the output voltage is 2×Vo, the state (b) in FIG. 16 shows the operating waveform when the output voltage is Vo, and the state (c) in FIG. 16 shows the operating waveform when the output voltage is Vo/2.

The reference voltage Vosc is the voltage of the VoD signal multiplied by k plus the Voffset voltage. The ramp voltage VR charges the capacitor Cosc with a current source proportional to the voltage of the reference voltage Vosc, so the higher the reference voltage Vosc, the greater the slope.

When the value of the Vfb signal is zero, the voltage VT is equal to the reference voltage Vosc, so the time until the ramp voltage VR becomes equal to the voltage VT does not change even if the output voltage changes. The value of the Vfb signal at the time when the time Enb_Delay becomes zero is when the voltage VT is zero, so the lower the value of the VoD signal, i.e., the lower the output voltage Vo, the less.

Figure 12:
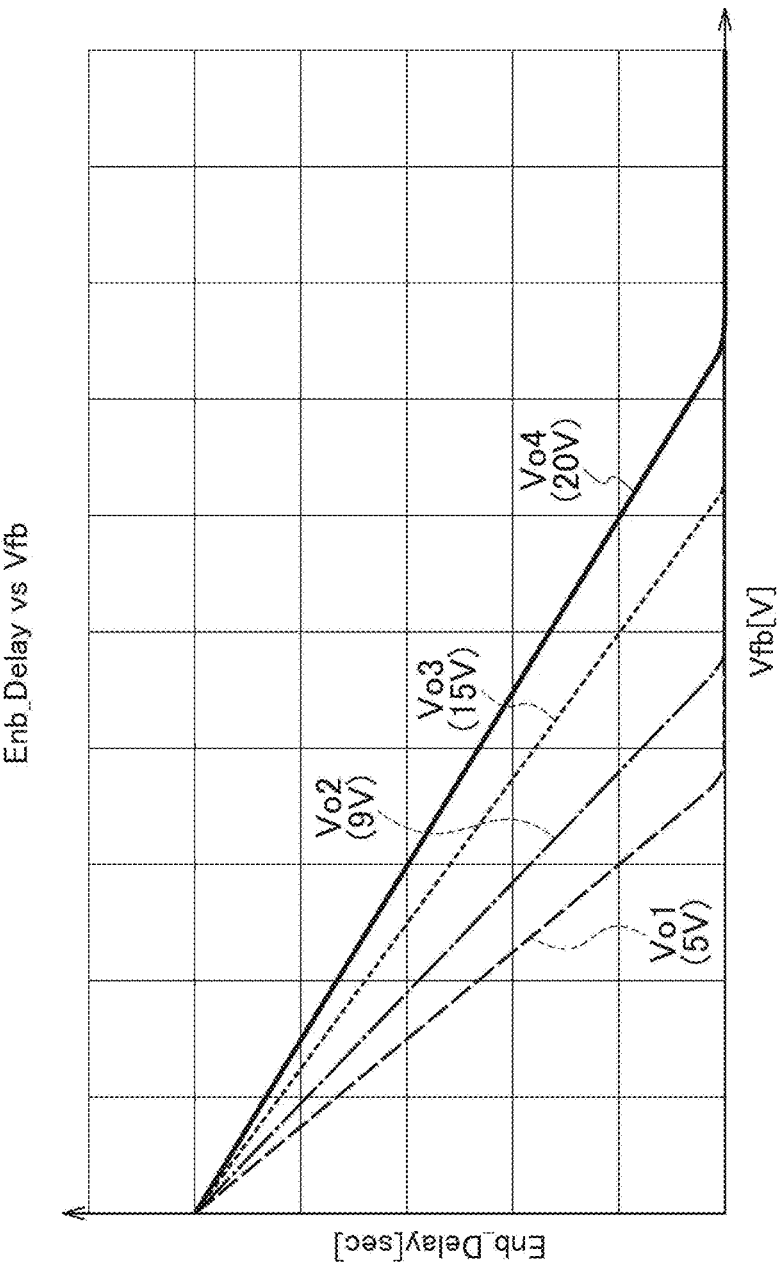
FIG. 12 is a diagram illustrating characteristics of an enable signal generator according to a second embodiment.

Therefore, the characteristics of the enable signal generator 130b in FIG. 10 are shown in FIG. 12. FIG. 12 shows the characteristics of enable signal generator 130b, where the horizontal axis is the value of the Vfb signal and the vertical axis is the time Enb_Delay.

As shown in FIG. 12, the characteristics of the second embodiment of the enable signal generator 130b are described below.

The time Enb_Delay from when the switch Sosc turns off until the Enb signal turns to High is controlled to be negatively proportional to the value of the Vfb signal. The time Enb_Delay when the value of the Vfb signal is zero is constant even if the output voltage changes, and the absolute value of the proportionality factor is controlled to become smaller as the output voltage increases.

Figure 13:
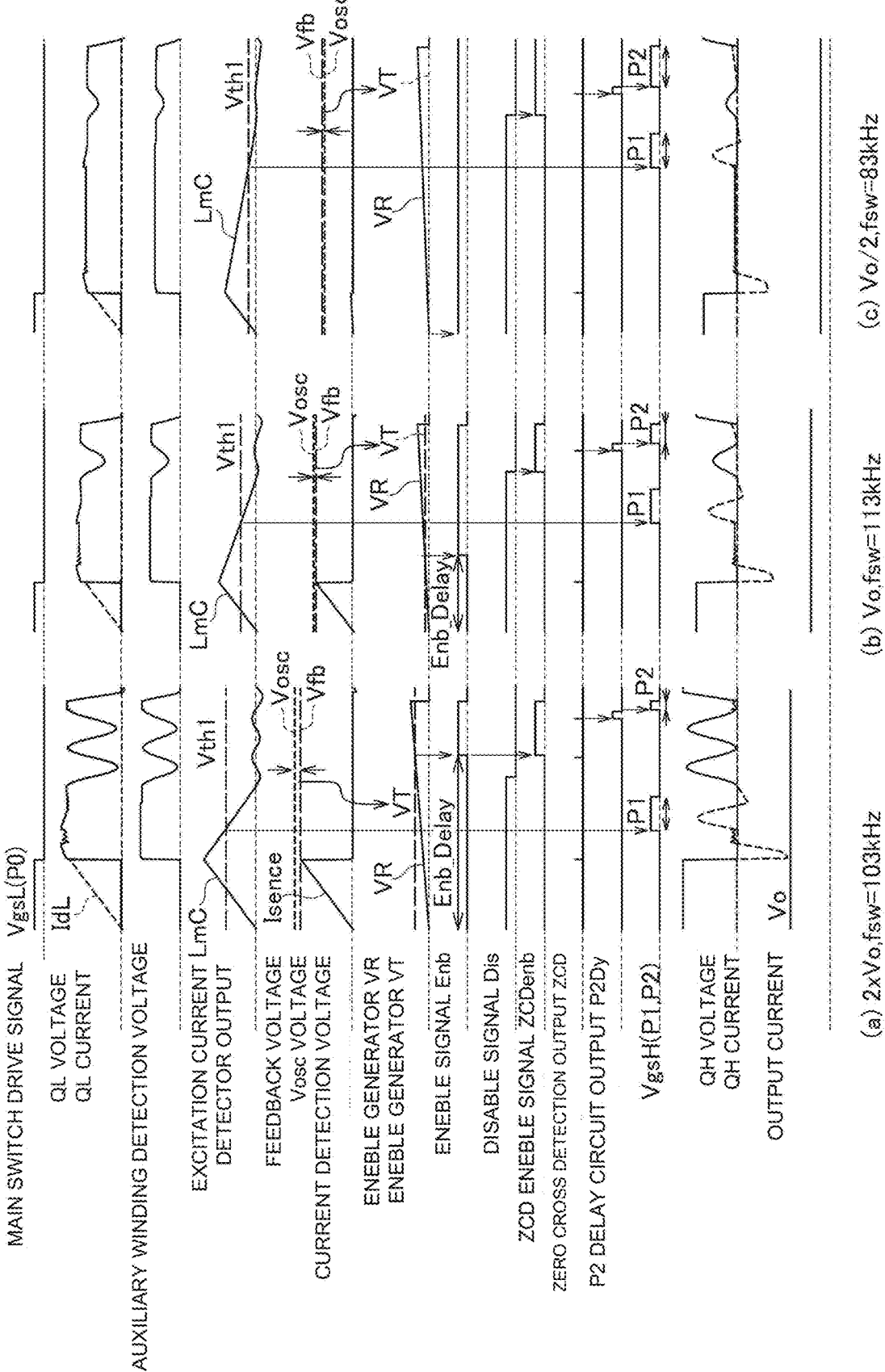
FIG. 13 is a diagram illustrating an example of an operating waveform of an ACF converter according to a second embodiment.

FIG. 13 shows the operating waveforms when the output voltage is increased or decreased without changing the output current in the controller 100b according to the second embodiment in FIG. 9.

The state (b) in FIG. 13 is the operating waveform when the output voltage is the same Vo as the state (b) in FIG. 8. The state (a) in FIG. 13 is the operating waveform when the output voltage is 2 Vo, the same as the state (a) in FIG. 8. The state (c) in FIG. 13 is the operating waveform when the output voltage is Vo/2, the same as the state (c) in FIG. 8.

In the state (a) of FIG. 13, the reference voltage Vosc is higher than the state (b) of FIG. 13 because the output voltage is doubled. Compared to the state (a) of FIG. 8 in the first embodiment, in the state (a) of FIG. 8, the time Enb_Delay is zero because the value of the Vfb signal is higher than the reference voltage Vosc. On the other hand, in the state (a) of FIG. 13, since the voltage VT is higher because the value of the Vfb signal is lower than the reference voltage Vosc, the slope of the ramp voltage VR is greater, but the frequency is reduced because the time Enb_Delay is longer.

In the state (c) of FIG. 13, the reference voltage Vosc is lower than in the state (b) of FIG. 13 because the output voltage is ½.

Compared to the state (c) in FIG. 8 in the first embodiment, the difference between the value of the Vfb signal and the reference voltage Vosc is smaller, so the slope of the ramp voltage VR is smaller, but the time Enb_Delay is shorter because the voltage VT is lower, and the frequency increases.

Therefore, frequency fluctuations when the output voltage changes are suppressed, and a highly efficient and compact power supply device may be realized.

Figure 14:
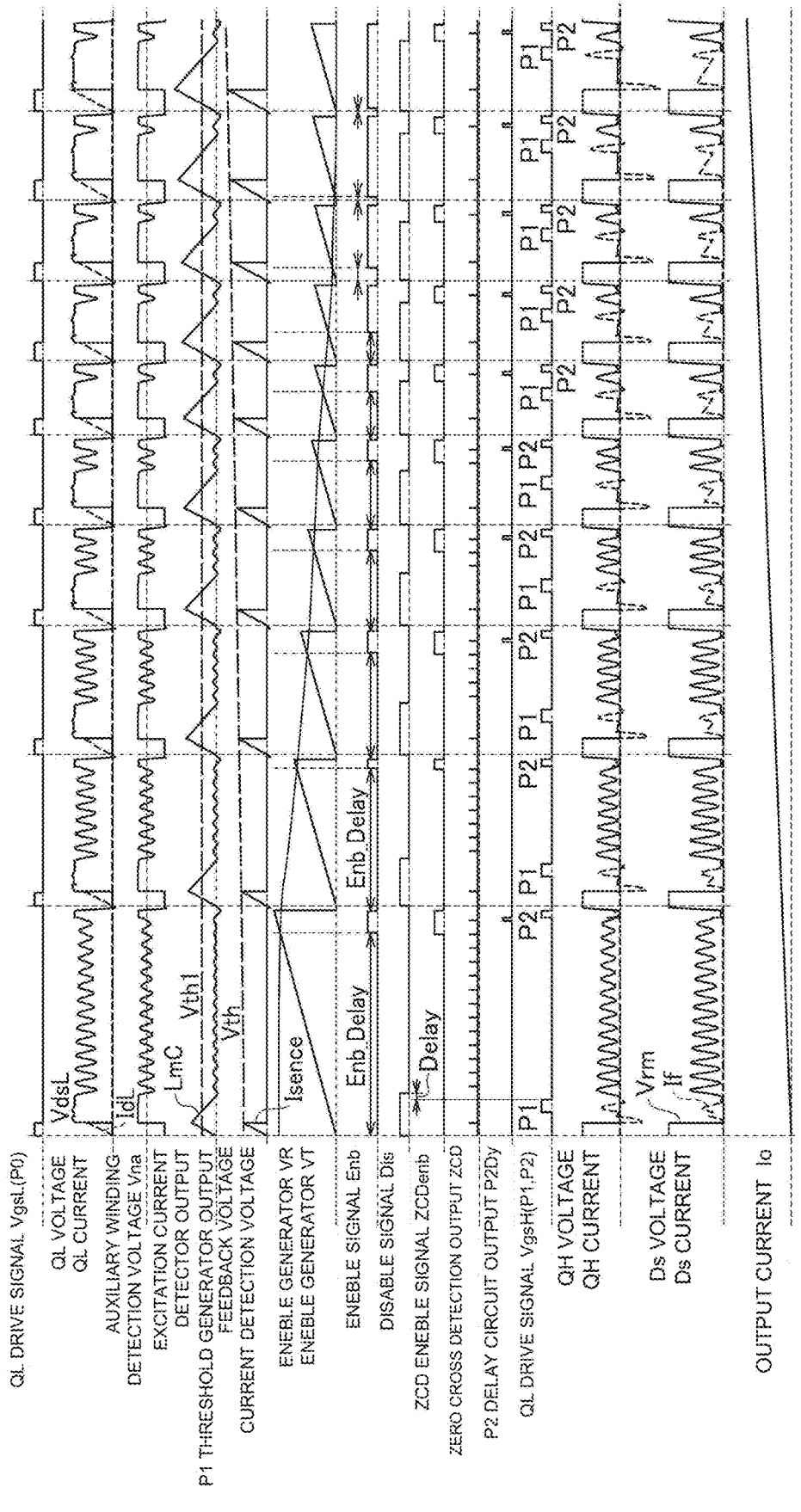
FIG. 14 is a diagram illustrating an example of an operating waveform of an ACF converter according to first and second embodiments.

FIG. 14 shows the operation of the ACF converter 10 and the controllers 100a and 100b according to the first and second embodiment. As the output current increases, the value of the Vfb signal increases, resulting in a lower voltage VT and a shorter time Enb_Delay of the Enb signal, which is the enable signal. As a result, the period T6 becomes shorter and the frequency increases.

If the output current is further increased, the time Enb_Delay becomes shorter than the edge of the Dis signal. In the absence of the Dis signal, it becomes uncontrollable, but the upper frequency limit is determined by the Dis signal, so that clamp switch QH turns on at the first maximum point in the resonant oscillation of Tcvlm. Furthermore, if the output current is increased, the periods T1 and T3 will become longer, and the frequency will decrease.

Figure 15:
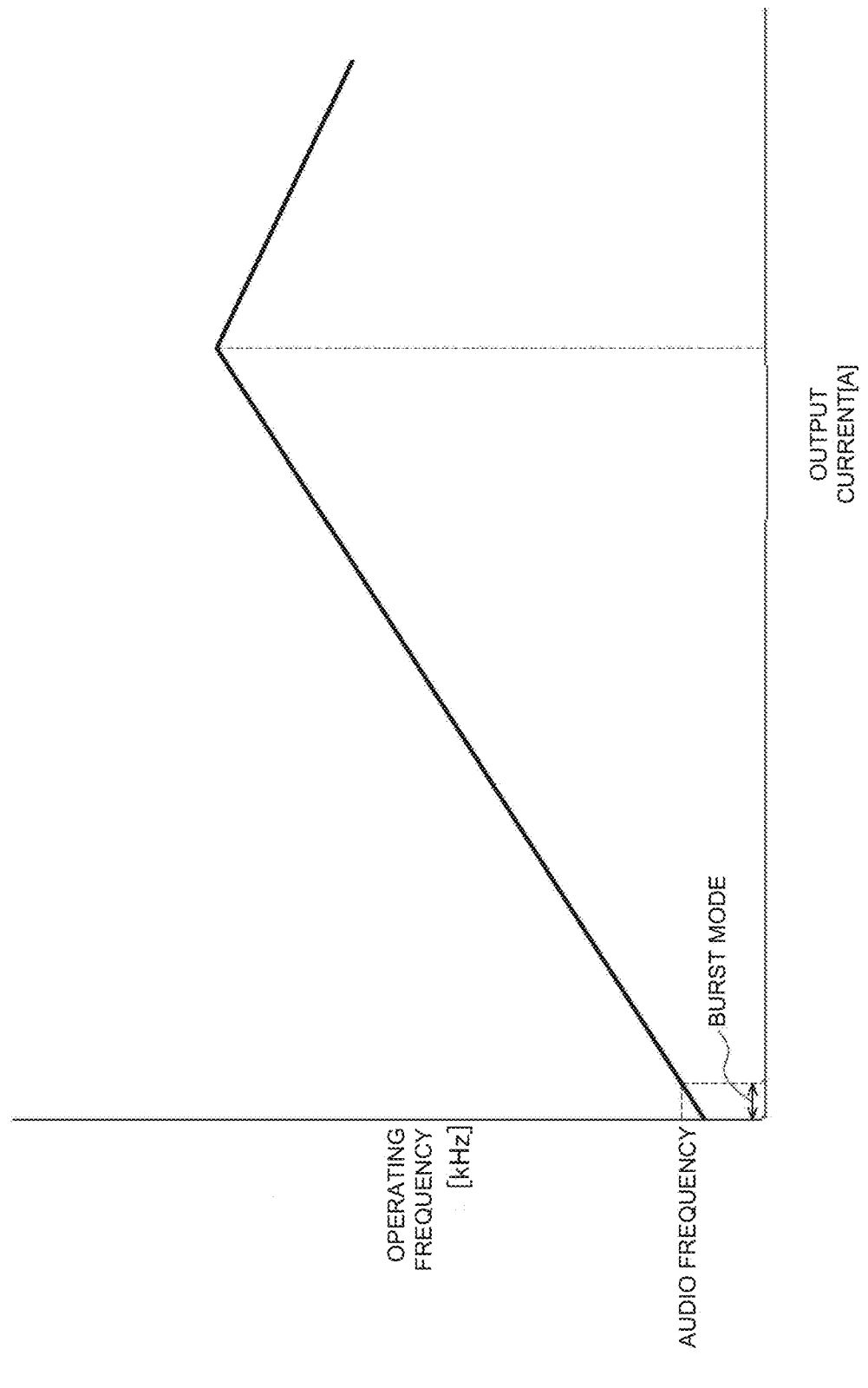
FIG. 15 is a diagram illustrating an operating frequency variation with output current according to first and second embodiments.

Thus, the change in operating frequency when output current changes according to the first and second embodiments is shown in FIG. 15. The frequency increases as the output current decreases from the maximum output current, and after reaching the maximum frequency, the frequency decreases as the output current decreases.

As is already widely known, there is a problem of high-frequency sound waves being generated from the power supply circuit when the operating frequency falls below the audible frequency, so the system may be put into burst mode before the operating frequency is set to the audible frequency.

As explained above, the control method of ACF converter 10 according to one or more embodiment may improve the disadvantages of complementary and non-complementary control, may enable ZVS over a wide output voltage-current range, and may enable ACF operation with high efficiency and low noise.

Other Embodiments

One or more embodiments have been described in detail with reference to the drawings, but one or more embodiments is not limited by what is described in the above examples. Also, the components described above include those that may be readily assumed by those skilled in the art and those that are substantially the same. Furthermore, the configurations described above may be combined as appropriate. In addition, various omissions, substitutions, or modifications of the configuration may be made to the extent that they do not depart from the scope of the examples.

The characteristics of the active clamp flyback converter and control IC are described below.

The active clamp flyback converter and control IC for one or more embodiments includes a first series circuit in which the main switch QL and primary winding Np are connected in series to both terminals of the DC power supply Vin, a second series circuit with clamp switch QH and clamp capacitor Cac connected in series at both terminals of the primary winding Np. The active clamp flyback converter and control IC also includes a transformer T having a secondary winding Ns electromagnetically coupled to the primary winding Np, and a controller 100a that turns on and off the main switch QL and clamp switch QH. The active clamp flyback converter and control IC also includes a rectifier smoothing circuit that rectifies and smoothes the voltage of the secondary winding Ns, and an output voltage detector 200 that detects the output voltage of the rectifier smoothing circuit. The controller 100a provides a first drive signal to turn on and off the main switch QL, a second drive signal to turn on/off the clamp switch QH during the period when the main switch QL is off, and a third drive signal to turn on and off the clamp switch QH after the second drive signal. The controller 100a also controls a first off period during which both main switch QL and clamp switch QH are off from the off time of the first drive signal to the on time of the second drive signal, and a second off period during which both main switch QL and clamp switch QH are off from the off time of the second drive signal to the on time of the third drive signal.

This configuration may enable the ACF converter 10 to maintain zero-volt switching operation with less operating frequency variation with changes in output voltage and output current.

According to one or more embodiments, the controller 100a of the active clamp flyback converter and control IC may have an excitation current detector 113 that detects the excitation current of transformer T and outputs a first voltage signal proportional to the excitation current and an output voltage detector 111 that outputs a second voltage signal proportional to the output voltage. The controller 100a may also set the timing of turning on the second drive signal based on the first voltage signal and a threshold value set based on the second voltage signal, so that the first drive signal is controlled and the first off period may be controlled as well based on the feedback voltage detected by the output voltage detector.

This configuration may allow the ACF converter 10 to achieve high efficiency and low noise ACF operation in the full load range, as ZVS is possible in frequency control when the load current is reduced, even if the frequency is reduced while the peak current of the excitation inductance is reduced.

According to one or more embodiments, the controller 100a of the active clamp flyback converter and control IC has an excitation current detector 113 that detects the excitation current of transformer T and outputs a first voltage signal proportional to the excitation current and a predetermined third voltage signal. The controller 100a may also set the on timing of the second drive signal based on the first voltage signal and the third voltage signal, so that the first drive signal is controlled and the first off period may also be controlled based on the feedback voltage detected by the output voltage detector 200.

This configuration may allow the ACF converter 10 to reduce the number of components, since the threshold value to be compared with the excitation current may be constant for a power supply whose output voltage does not change.

According to one or more embodiments, the controller 100a of the active clamp flyback converter and control IC may be equipped with an enable signal generator 130a that generates enable signal based on the feedback voltage detected by the output voltage detector 200, and a disable signal generator 142 that generates a disable signal based on the second drive signal. The controller 100a may control the second off period by controlling the third drive signal based on the enable and disable signals.

This configuration may enable the ACF converter 10 to maintain zero-volt switching operation with less operating frequency variation with changes in output voltage and output current.

According to one or more embodiments, the controller 100a of the active clamp flyback converter and control IC may include an output voltage detector 111 that outputs a second voltage signal proportional to the output voltage, an enable signal generator 130a that generates an enable signal based on the feedback voltage detected by the second voltage signal and an output voltage detector 200, and a disable signal generator 142 that generates a disable signal based on the second drive signal. The controller 100a may control the second off period by controlling the third drive signal based on the enable and disable signals.

This configuration may allow the ACF converter 10 to achieve control with little fluctuation in operating frequency with respect to changes in output voltage, enabling the realization of compact and highly efficient power supply configurations. For example, the operating frequency fluctuation must be small in power supplies that require varying output voltage, the ACF converter 10 may be more suitable for such a configuration.

According to one or more embodiments, the enable signal generator 130a of the active clamp flyback converter and control IC may be controlled so that the Enb_Delay, the time between the main switch QL turning on and the Enb signal going to High, is proportional to the negative value to Vfb signal.

This configuration may enable the ACF converter 10 to maintain zero-volt switching operation with less operating frequency variation with changes in output voltage and output current.

According to one or more embodiments, the enable signal generator 130a of the active clamp flyback converter and control IC may be controlled so that the Enb_Delay, the time between the main switch QL turning on and the Enb signal going to High, is proportional to the negative value to the Vfb signal, and may be controlled so that the absolute value of the proportionality factor decreases as the output voltage increases.

This configuration may enable the ACF converter 10 to maintain zero-volt switching operation with less operating frequency variation with changes in output voltage and output current.

One or more embodiments has been made in view of the problems of these conventional technologies. And the purpose of one or more embodiments is to provide an active clamp flyback converter and control IC capable of maintaining zero-volt switching operation with less operating frequency fluctuation due to changes in output voltage and output current.

As described above, according to one or more embodiments, it may be possible to provide an active clamp flyback converter and control IC that may maintain zero-volt switching operation with less operating frequency variation with changes in output voltage and output current.

The invention claimed is:

1. An active clamp flyback converter comprising:
a first series circuit comprising a primary winding, and a main switch, the main switch and the primary winding being connected in series with both terminals of a DC power supply;
a second series circuit comprising a clamp switch, and a clamp capacitor, the clamp switch and the clamp capacitor being connected in series at both terminals of the primary winding;
a transformer comprising a secondary winding electromagnetically connected to the primary winding;
a controller that controls the main switch and the clamp switch;
a rectifier smoothing circuit that rectifies and smoothes a voltage in the secondary winding; and
an output voltage detector that detects an output voltage of the rectifier smoothing circuit, wherein
the controller performs operations comprising:
generating a first drive signal for controlling the main switch;
generating a second drive signal for controlling the clamp switch during a time period when the main switch is off;
generating a third drive signal for controlling the clamp switch after the second drive signal;
controlling a first off period during which both the main switch and the clamp switch are off from an off time of the first drive signal to the on time of the second drive signal; and
controlling a second off period during which both the main switch and the clamp switch are off from the off time of the second drive signal to the on time of the third drive signal,
the controller further comprises:
an excitation current detector that detects an excitation current of the transformer and outputs a first voltage signal proportional to the excitation current; and
an output voltage detector that outputs a second voltage signal proportional to the output voltage, and
the controller further controls a timing of turning on the second drive signal based on the first voltage signal and a threshold value set based on the second voltage signal, so that the first drive signal is controlled and the first off period is controlled based on a feedback voltage detected by the output voltage detector.

2. The active clamp flyback converter according to claim 1, wherein
the controller comprises an excitation current detector that detects an excitation current of the transformer and generates a first voltage signal proportional to the excitation current and a third voltage signal,
the controller controls an on timing of the second drive signal based on the first voltage signal and a third voltage signal, so that the first drive signal and the first off period is controlled based on a feedback voltage detected by the output voltage detector.

3. The active clamp flyback converter according to claim 1, wherein the controller comprises:

an enable signal generator that generates an enable signal based on a feedback voltage detected by the output voltage detector; and a disable signal generator that generates a disable signal based on the second drive signal, the controller controls the second off period by controlling the third drive signal based on the enable and disable signals.

4. The active clamp flyback converter according to claim 1, wherein the controller comprises:

an output voltage detector that outputs a second voltage signal proportional to the output voltage; and an enable signal generator that generates an enable signal based on the second voltage signal and a feedback voltage detected by the output voltage detector, and a disable signal generator that generates a disable signal based on the second drive signal, the controller controls the second off period by controlling the third drive signal based on the enable and disable signals.

5. The active clamp flyback converter according to claim 3, wherein the enable signal generator controls a period of time from when the main switch is turned on until the enable signal turns to High to be proportional to a negative value with respect to the feedback voltage.

6. The active clamp flyback converter according to claim 4, wherein the enable signal generator controls a period of time from when the main switch is turned on until the enable signal turns to High to be proportional to a negative value with respect to the feedback voltage, and an absolute value of a proportionality factor decreases as the output voltage increases.

* * * * *